US012576334B2

(12) United States Patent
Nishigori et al.

(10) Patent No.: US 12,576,334 B2
(45) Date of Patent: Mar. 17, 2026

(54) RECEPTION APPARATUS, TRANSMISSION APPARATUS, AND INFORMATION PROCESSING METHOD

(71) Applicant: SONY GROUP CORPORATION, Tokyo (JP)

(72) Inventors: Shuichiro Nishigori, Tokyo (JP); Hirofumi Takeda, Tokyo (JP); Takahiro Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 165 days.

(21) Appl. No.: 18/264,154

(22) PCT Filed: Jan. 12, 2022

(86) PCT No.: PCT/JP2022/000744
§ 371 (c)(1),
(2) Date: Aug. 3, 2023

(87) PCT Pub. No.: WO2022/176440
PCT Pub. Date: Aug. 25, 2022

(65) Prior Publication Data
US 2024/0307764 A1 Sep. 19, 2024

(30) Foreign Application Priority Data
Feb. 18, 2021 (JP) ................................. 2021-024624

(51) Int. Cl.
*A63F 13/285* (2014.01)
*A63F 13/215* (2014.01)
(Continued)

(52) U.S. Cl.
CPC .......... *A63F 13/285* (2014.09); *A63F 13/215* (2014.09); *A63F 13/424* (2014.09); *G06F 3/016* (2013.01)

(58) Field of Classification Search
CPC ...... A63F 13/285; A63F 13/424; G06F 3/016; G06F 2203/013; G10L 21/16;
(Continued)

(56) References Cited

U.S. PATENT DOCUMENTS

| | | | | |
|---|---|---|---|---|
| 2013/0131851 A1* | 5/2013 | Ullrich | ...................... | G06F 3/16 |
| | | | | 700/94 |
| 2022/0193538 A1* | 6/2022 | Goh | ........................ | G06V 40/20 |

FOREIGN PATENT DOCUMENTS

| | | |
|---|---|---|
| JP | 2015-053037 A | 3/2015 |
| JP | 2015-185168 A | 10/2015 |

(Continued)

OTHER PUBLICATIONS

International Search Report and Written Opinion of PCT Application No. PCT/JP2022/000744, issued on Mar. 15, 2022, 09 pages of ISRWO.

*Primary Examiner* — Lawrence S Galka
(74) *Attorney, Agent, or Firm* — CHIP LAW GROUP

(57) ABSTRACT

A reception apparatus includes a reception processing section configured to receive data including an acoustic signal and reproduction enabled/disabled information for a haptic sensation signal, and a haptic sensation signal generation section configured to generate the haptic sensation signal on the basis of the acoustic signal received by the reception processing section. The haptic sensation signal generation section generates the haptic sensation signal in a case where the reproduction enabled/disabled information indicates that reproduction is enabled, but does not generate the haptic sensation signal in a case where the reproduction enabled/disabled information indicates that reproduction is disabled.

18 Claims, 17 Drawing Sheets

DATA STRUCTURE OF ENCODED DATA

| 22 | 23 | 24 | 25 | 26 | 21 |
|---|---|---|---|---|---|
| SYNC WORD REGION | BIT RATE REGION | SAMPLING RATE REGION | CHANNEL MODE REGION | RESERVED REGION | PAYLOAD REGION |

20 (HEADER REGION)

(51) Int. Cl.
    *A63F 13/424*     (2014.01)
    *G06F 3/01*     (2006.01)

(58) Field of Classification Search
    CPC .......... H04N 21/43079; H04R 2460/13; H04R
                           2201/023; B06B 1/045
    See application file for complete search history.

(56)                   References Cited

FOREIGN PATENT DOCUMENTS

| | | | |
|---|---|---|---|
| JP | 2016-213667 | A | 12/2016 |
| WO | 2021/019925 | A1 | 2/2021 |

* cited by examiner

F I G . 1
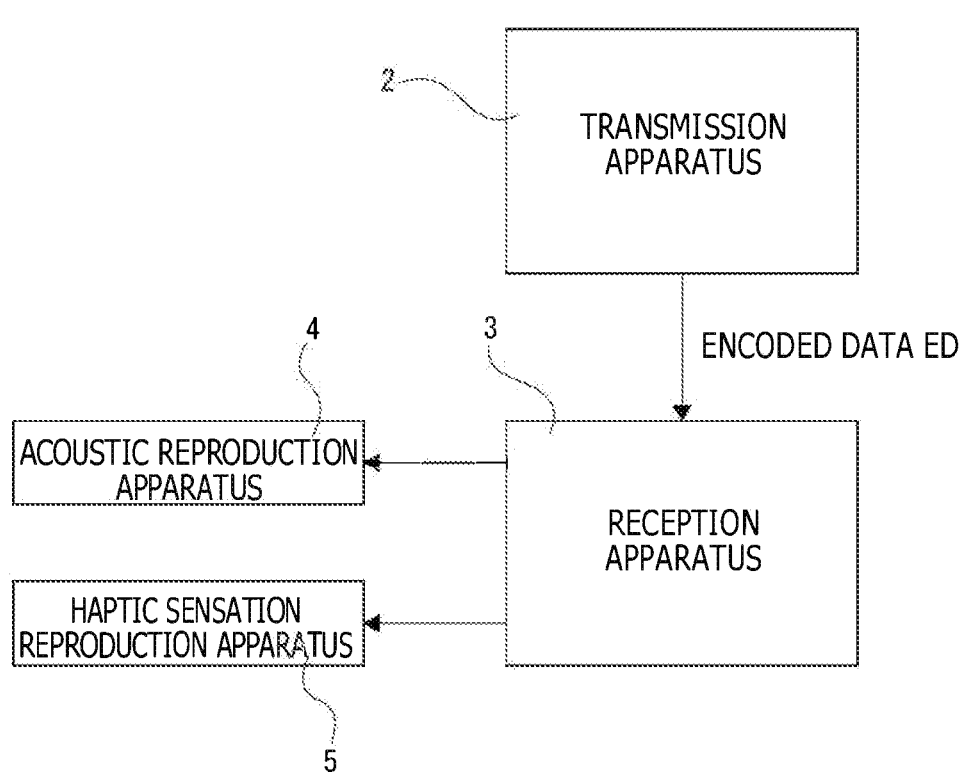
2 TRANSMISSION APPARATUS
ENCODED DATA ED
4 ACOUSTIC REPRODUCTION APPARATUS
3 RECEPTION APPARATUS
HAPTIC SENSATION REPRODUCTION APPARATUS 5
1
HAPTIC SENSATION PRESENTATION SYSTEM

F I G . 2
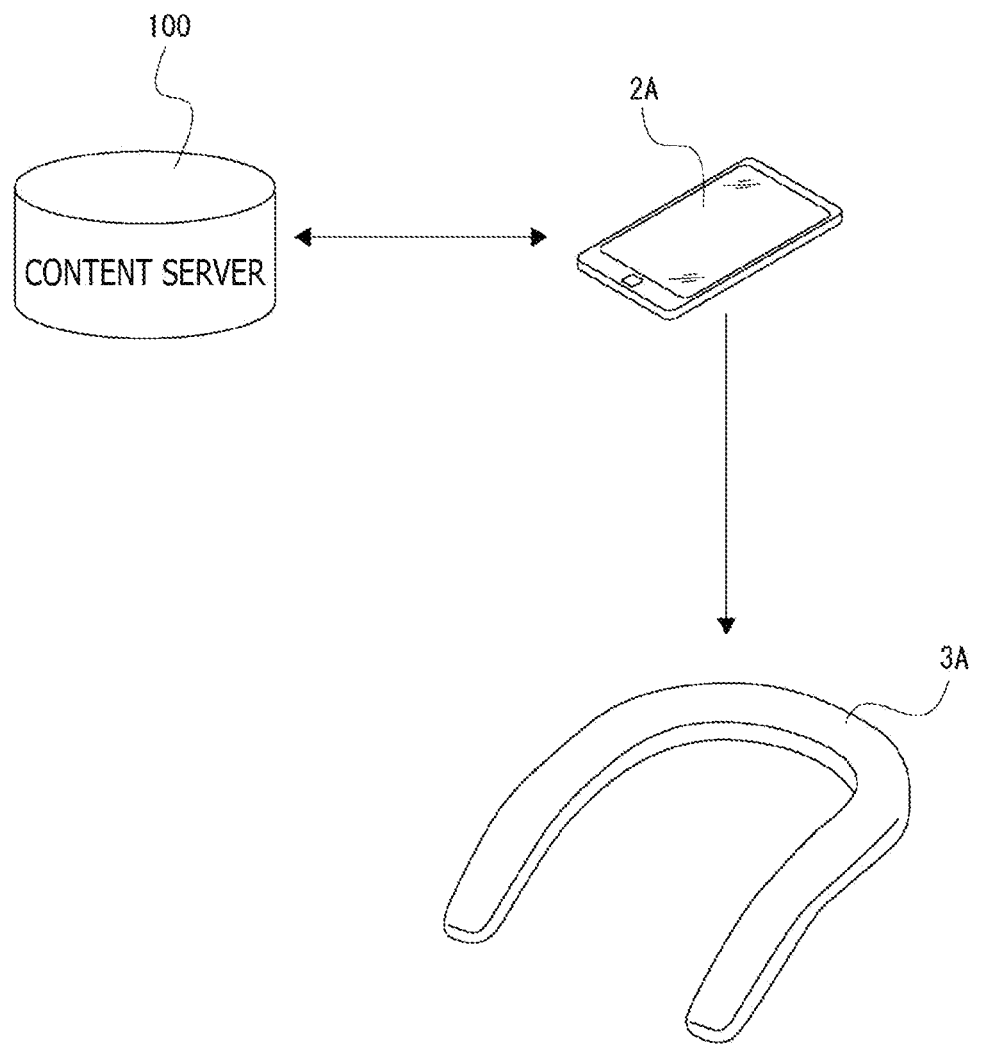

F I G . 4
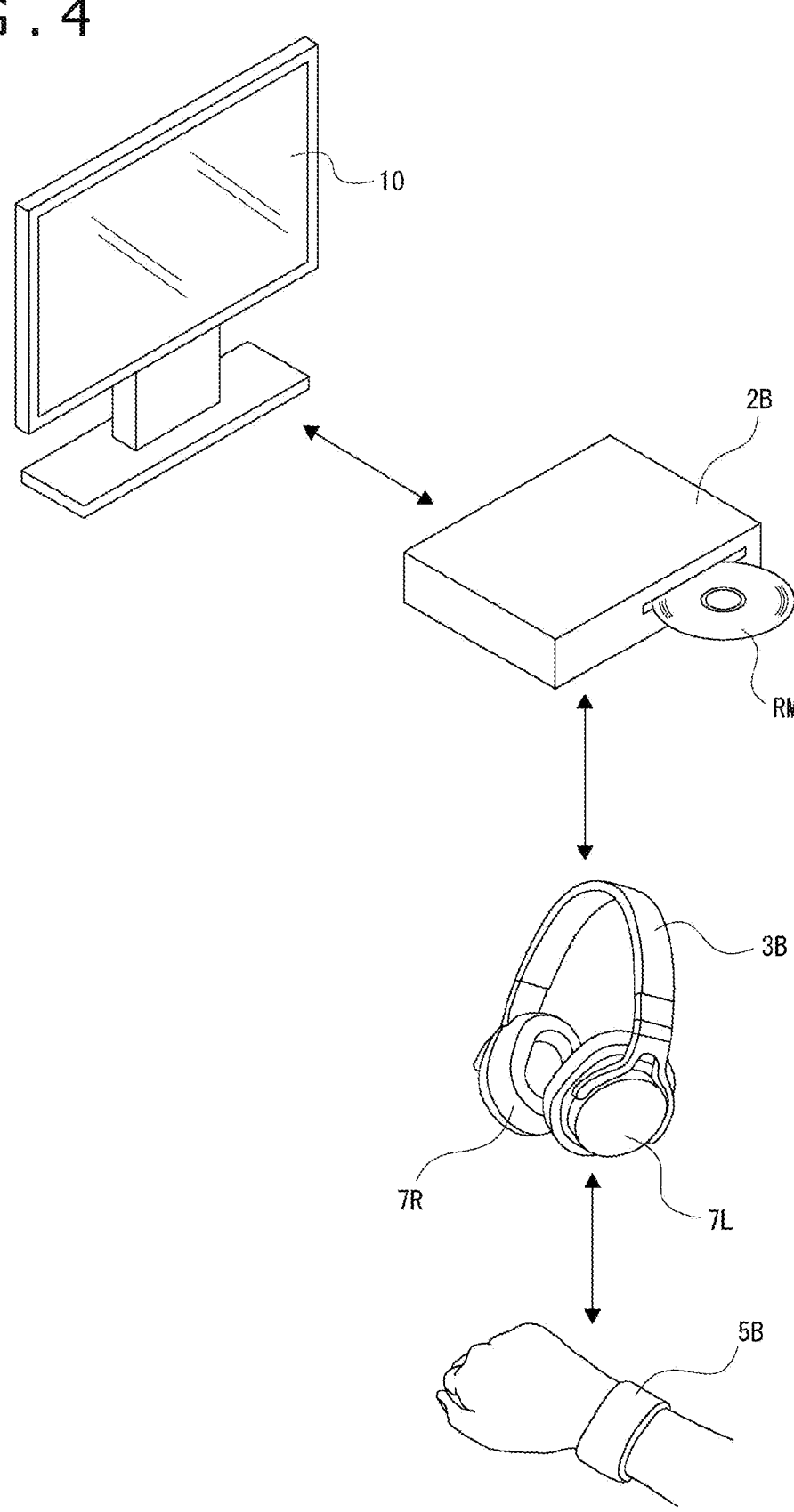

F I G . 5
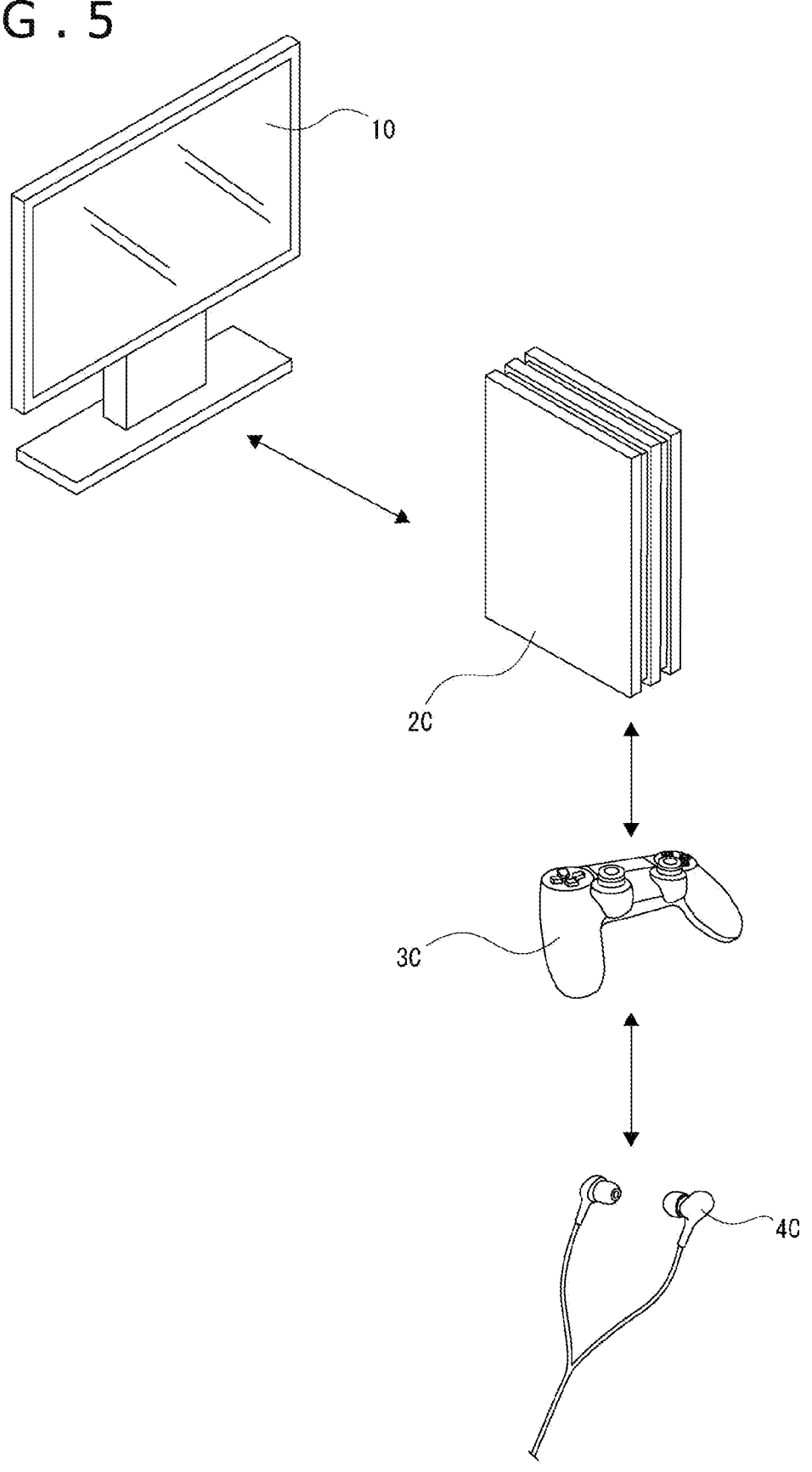

FIG. 6

DATA STRUCTURE OF ENCODED DATA

F I G . 7
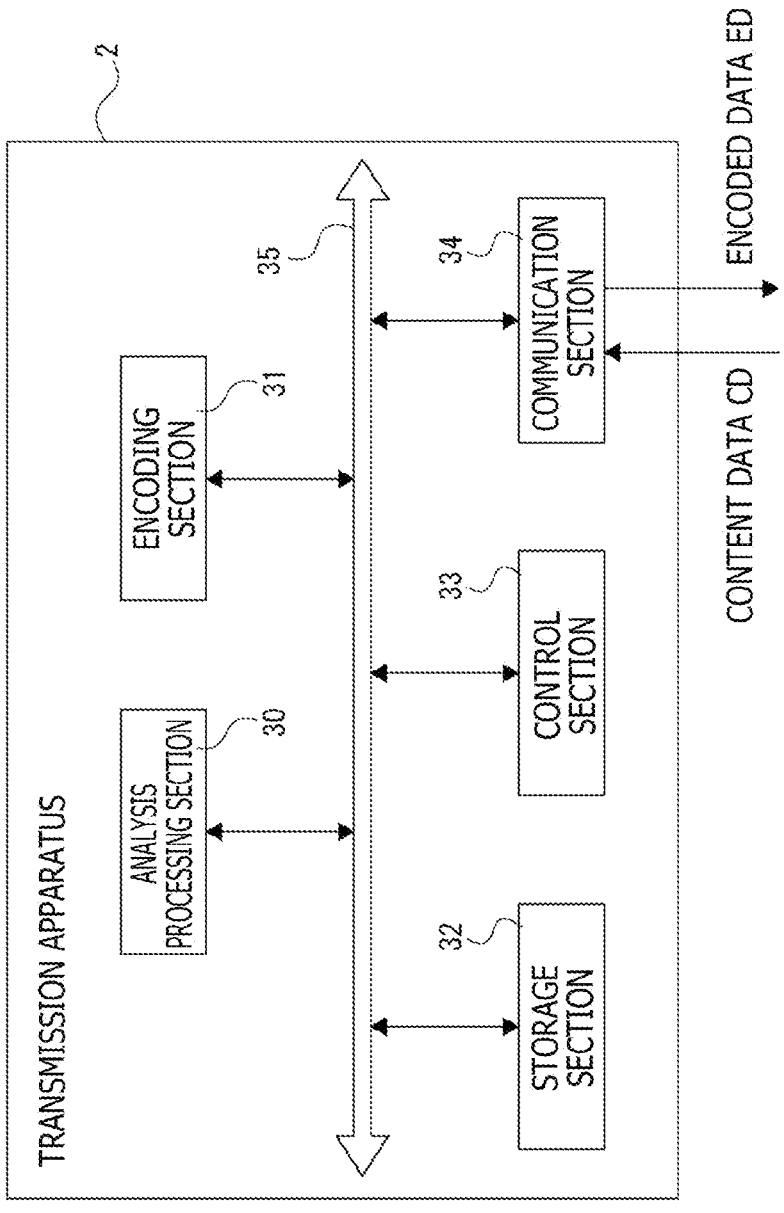

F I G . 8
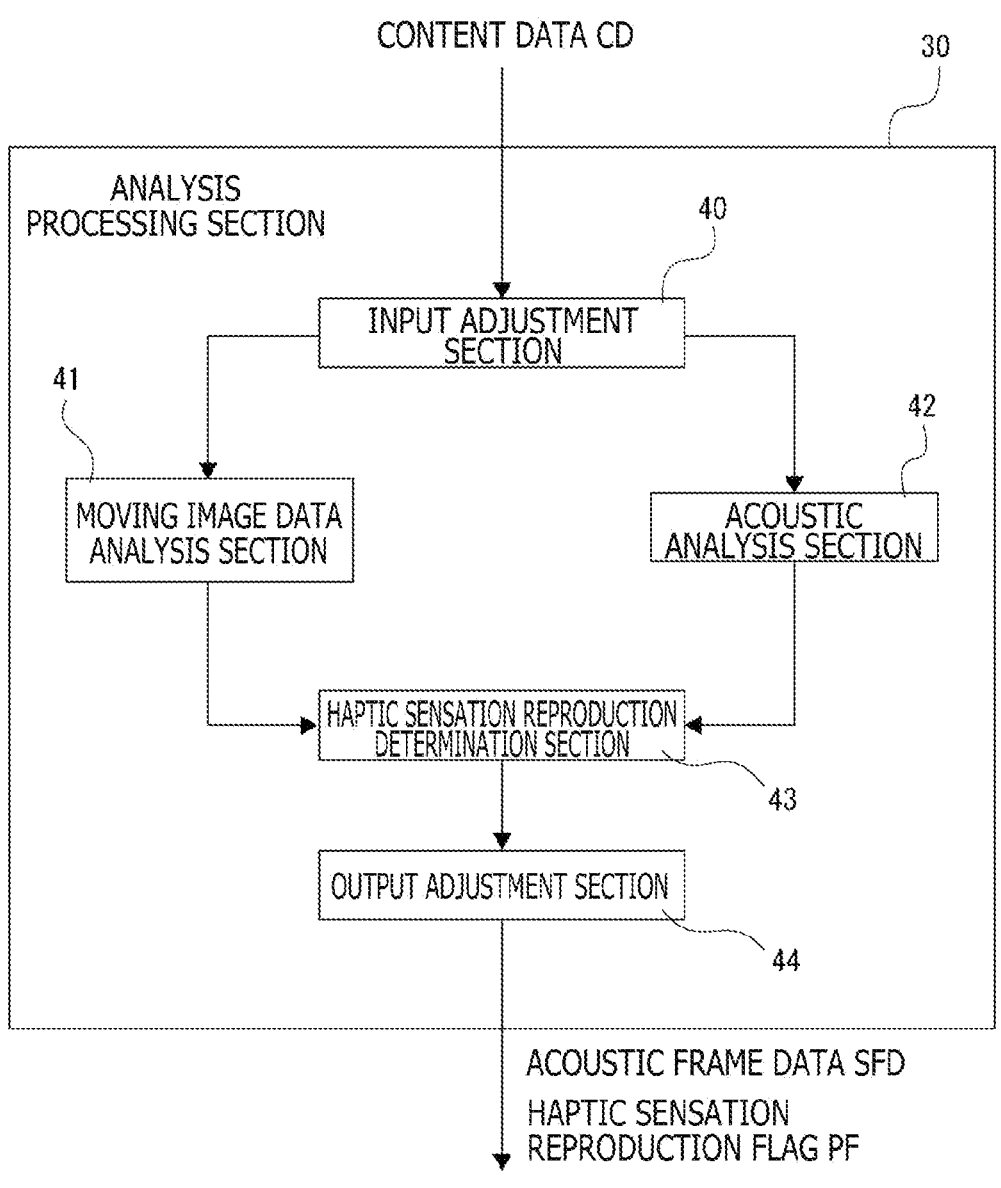
CONTENT DATA CD
30
ANALYSIS
PROCESSING SECTION
40
INPUT ADJUSTMENT
SECTION
41
MOVING IMAGE DATA
ANALYSIS SECTION
42
ACOUSTIC
ANALYSIS SECTION
HAPTIC SENSATION REPRODUCTION
DETERMINATION SECTION
43
OUTPUT ADJUSTMENT SECTION
44
ACOUSTIC FRAME DATA SFD
HAPTIC SENSATION
REPRODUCTION FLAG PF F I G . 9
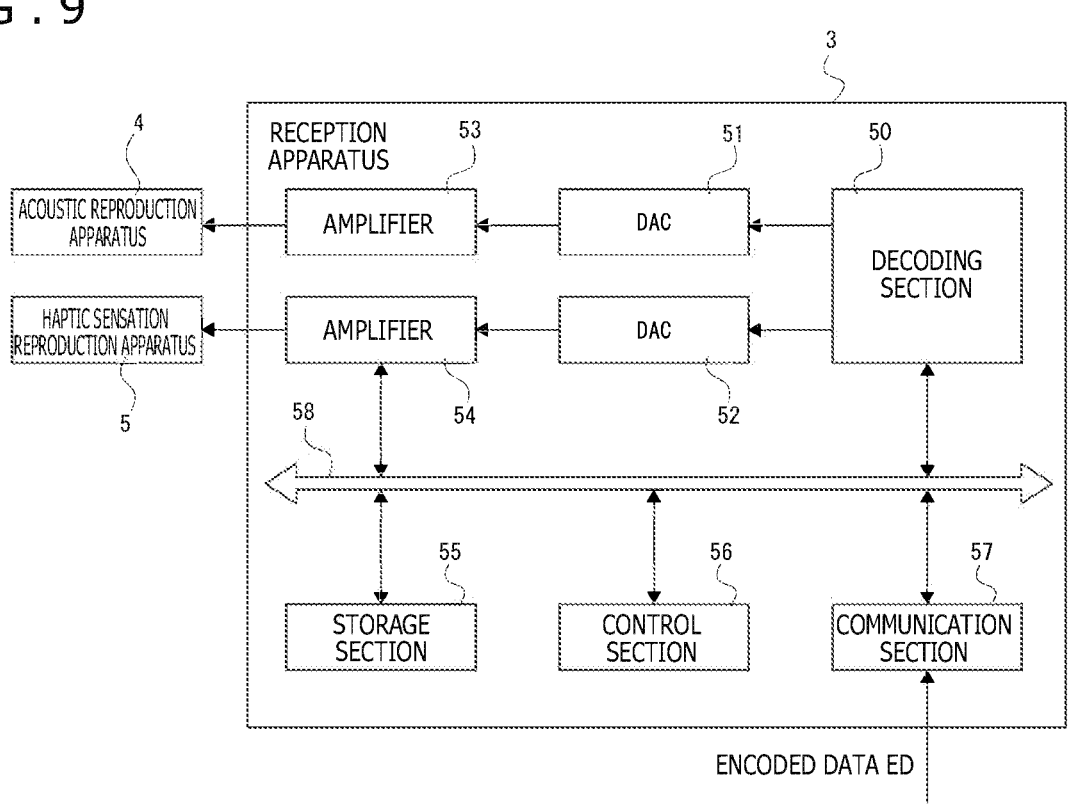

F I G . 1 0
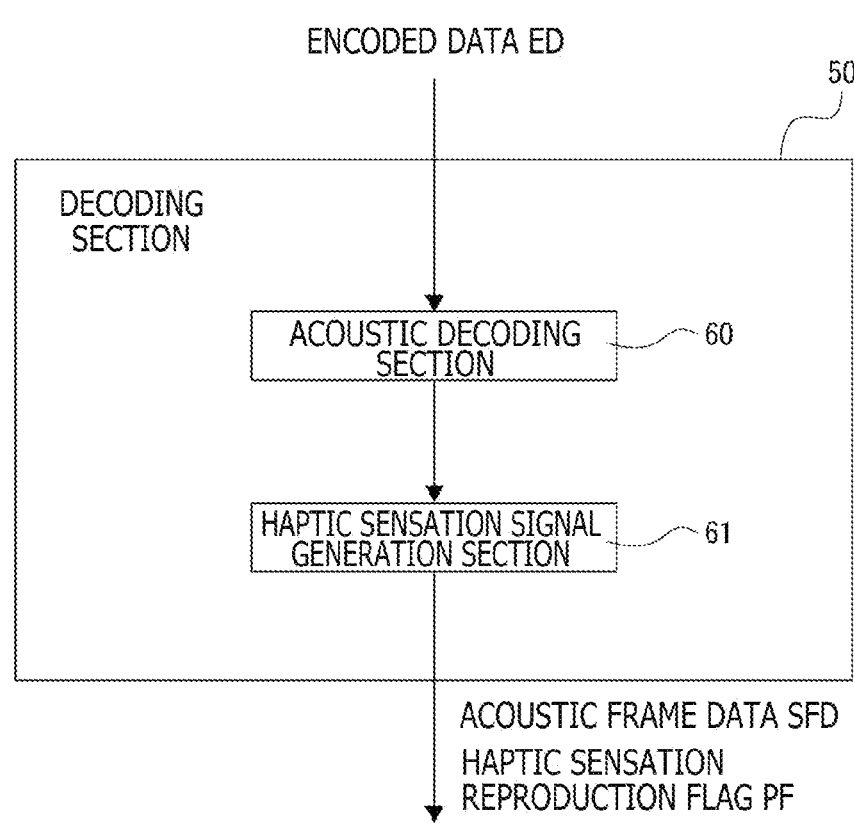
ENCODED DATA ED
50
DECODING
SECTION
ACOUSTIC DECODING
SECTION    ~ 60
HAPTIC SENSATION SIGNAL
GENERATION SECTION    ~ 61
ACOUSTIC FRAME DATA SFD
HAPTIC SENSATION
REPRODUCTION FLAG PF

FIG.11

F I G . 1 3
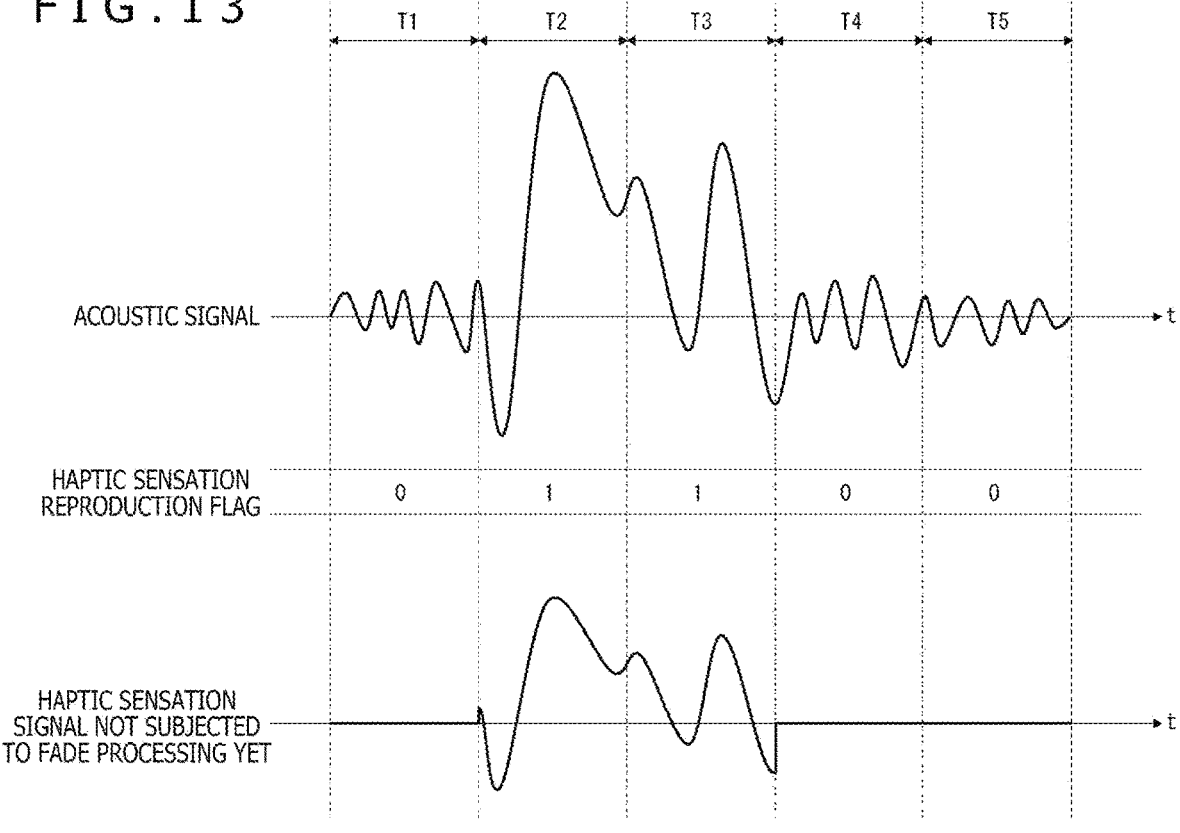

FIG.17

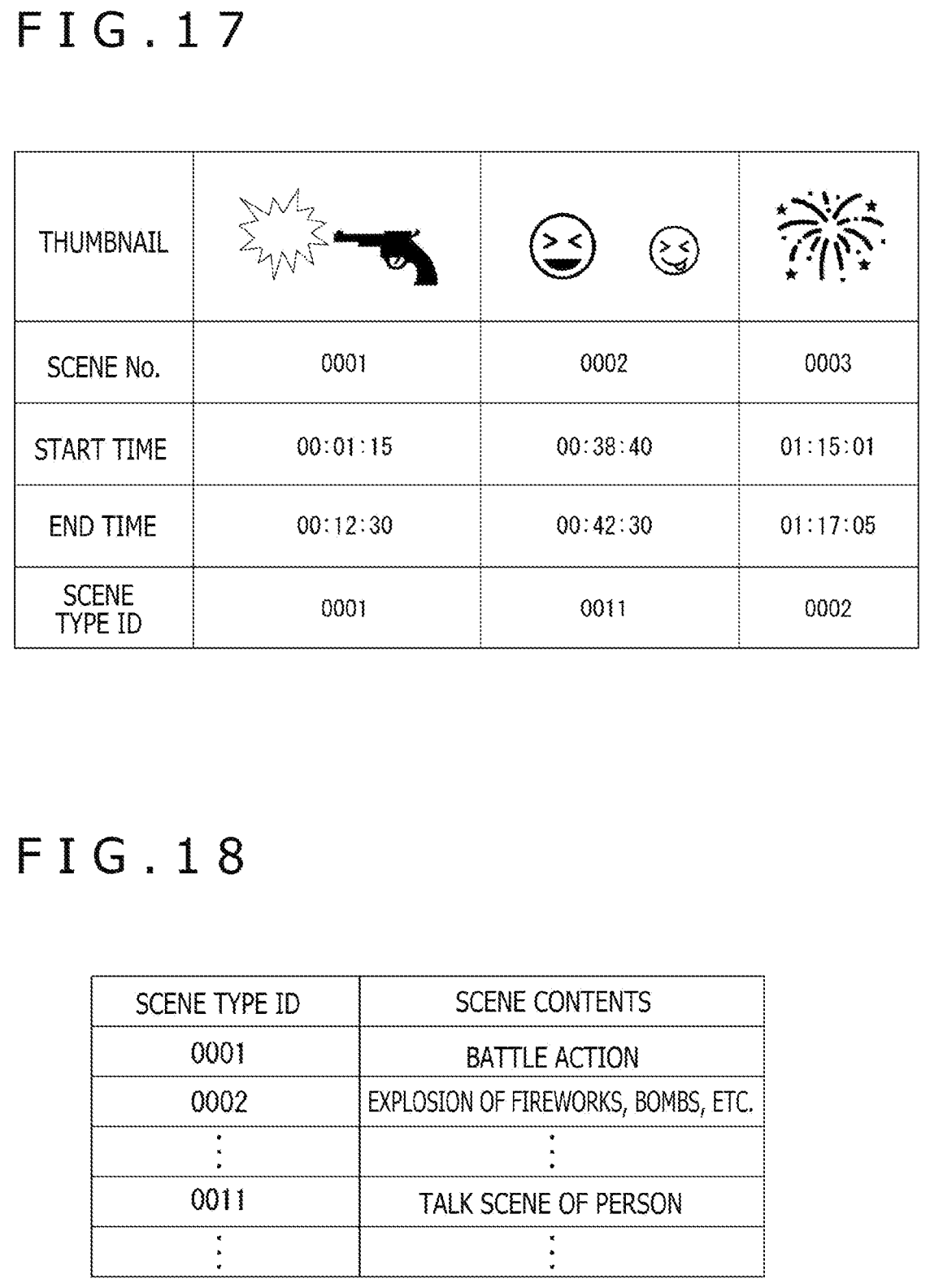

| THUMBNAIL | | | |
|---|---|---|---|
| SCENE No. | 0001 | 0002 | 0003 |
| START TIME | 00:01:15 | 00:38:40 | 01:15:01 |
| END TIME | 00:12:30 | 00:42:30 | 01:17:05 |
| SCENE TYPE ID | 0001 | 0011 | 0002 |

FIG.18

| SCENE TYPE ID | SCENE CONTENTS |
|---|---|
| 0001 | BATTLE ACTION |
| 0002 | EXPLOSION OF FIREWORKS, BOMBS, ETC. |
| ⋮ | ⋮ |
| 0011 | TALK SCENE OF PERSON |
| ⋮ | ⋮ |

RECEPTION APPARATUS, TRANSMISSION APPARATUS, AND INFORMATION PROCESSING METHOD

CROSS REFERENCE TO RELATED APPLICATIONS

This application is a U.S. National Phase of International Patent Application No. PCT/JP2022/000744 filed on Jan. 12, 2022, which claims priority benefit of Japanese Patent Application No. JP 2021-024624 filed in the Japan Patent Office on Feb. 18, 2021. Each of the above-referenced applications is hereby incorporated herein by reference in its entirety.

TECHNICAL FIELD

The present invention relates to a technical field of a reception apparatus, a transmission apparatus, an information processing method, and a program for transmitting or receiving data related to haptic sensation presentation.

BACKGROUND ART

A technology has been developed that is used to give to a user a haptic stimulus in synchronization with presentation of visual information or auditory information. The haptic sensation presentation means using vibration, pressure, or the like to provide the user with haptic sensation of contacting an object or haptic sensation of a collision.

Providing the user with a haptic stimulus requires a haptic sensation signal for the haptic stimulus. The haptic sensation signal is, for example, generated based on measurement values measured by various sensors attached to the user.

However, financial and temporal costs are required to sufficiently create an environment for generating such a haptic sensation signal.

In view of such circumstances, for example, PTL 1 listed below discloses a technology for generating a haptic sensation signal by using an acoustic signal (sound signal).

CITATION LIST

Patent Literature

[PTL 1]
Japanese Patent Laid-open No. 2015-053037

SUMMARY

Technical Problems

The haptic sensation signal generated from the acoustic signal may wirelessly be transmitted along with the acoustic signal and provided to a reproduction apparatus. However, problems with the haptic sensation signal are a limited communication band and the need to newly establish a communication scheme for communicating the haptic sensation signal.

Additionally, the acoustic signal includes not only signals appropriate for presentation of a haptic stimulus, such as an explosion sound, but also signals inappropriate for presentation of a haptic stimulus, such as background music and spoken lines.

Haptic stimuli generated in association with such unwanted acoustic signals are not only ineffective in improving realistic sensation for the user but also make the user feel uncomfortable.

The present technology has been made in view of such problems, and an object of the present technology is to provide an environment that presents an appropriate haptic stimulus to the user.

Solution to Problems

A reception apparatus according to the present technology includes a reception processing section configured to receive data including an acoustic signal and reproduction enabled/disabled information for a haptic sensation signal, and a haptic sensation signal generation section configured to generate the haptic sensation signal on the basis of the acoustic signal received by the reception processing section. The haptic sensation signal generation section generates the haptic sensation signal in a case where the reproduction enabled/disabled information indicates that reproduction is enabled, but does not generate the haptic sensation signal in a case where the reproduction enabled/disabled information indicates that reproduction is disabled.

This enables creation of an interval during which haptic sensation presentation in synchronization with the acoustic signal is not performed. For example, it is possible to set reproduction enabled/disabled information indicating that no haptic sensation signal is generated for an interval during which the haptic sensation presentation in synchronization with the acoustic signal is not appropriate.

In the reception apparatus described above, the reproduction enabled/disabled information may be provided for each piece of acoustic frame data obtained by separating the acoustic signal into predetermined lengths of time, and the haptic sensation signal generation section may generate the haptic sensation signal on the basis of the acoustic frame data corresponding to the reproduction enabled/disabled information indicating that reproduction is enabled, but may not generate the haptic sensation signal on the basis of the acoustic frame data corresponding to the reproduction enabled/disabled information indicating that reproduction is disabled.

By providing the reproduction enabled/disabled information for each piece of acoustic frame data, intervals during which to generate the haptic sensation signal can finely be set.

In the reception apparatus described above, the reproduction enabled/disabled information may be flag information having 1 bit.

This reduces the data amount of data received by the reception processing section.

In the reception apparatus, the data received may include encoded data encoded using an encoding scheme for acoustic data, the encoded data may have a structure including a payload region in which the acoustic frame data is stored and a reserved region, and the reproduction enabled/disabled information may be stored in the reserved region.

The storage of the reproduction enabled/disabled information in the reserved region realizes reception of the reproduction enabled/disabled information with use of a mechanism for transmitting the acoustic frame data.

In the reception apparatus described above, the reproduction enabled/disabled information may be generated on the basis of partial moving image data to be reproduced in synchronization with the acoustic frame data.

Whether or not to provide the user with a haptic stimulus may fail to be determined from the acoustic signal acquired from the acoustic frame data. The present configuration prevents inappropriate reproduction enabled/disabled information from being generated on the basis of the acoustic frame data.

The haptic sensation signal generation section in the reception apparatus described above may execute fade-in processing and fade-out processing on the generated haptic sensation signal.

Fade processing such as fade-in processing or fade-out processing is processing for gradually increasing or reducing the signal over time and, for example, processing of multiplication by a predetermined gain function. The appropriate fade processing at the start and end of the haptic sensation presentation allows the haptic sensation presentation to smoothly be started and ended, allowing natural haptic sensation experiences to be provided.

The haptic sensation signal generation section in the reception apparatus described above may execute fade-in processing on the haptic sensation signal generated from a target piece of acoustic frame data in a case where the reproduction enabled/disabled information corresponding to the target acoustic frame data indicates that reproduction is enabled and the reproduction enabled/disabled information corresponding to a preceding piece of acoustic frame data that is acoustic frame data immediately preceding the target acoustic frame data indicates that reproduction is disabled, and may execute fade-out processing on the haptic sensation signal generated from the preceding acoustic frame data in a case where the reproduction enabled/disabled information corresponding to the target acoustic frame data indicates that reproduction is disabled and the reproduction enabled/disabled information corresponding to the preceding acoustic frame data indicates that reproduction is enabled.

That is, either the fade-in processing operation or the fade-out processing operation is executed at the timing when the reproduction enabled/disabled information is changed.

A transmission apparatus according to the present technology includes an analysis processing section configured to execute analysis processing on content data including at least an acoustic signal and generate reproduction enabled/disabled information indicating whether to enable or disable reproduction of a haptic sensation signal, and a transmission processing section configured to transmit the reproduction enabled/disabled information and the acoustic signal.

Analyzing the content data allows determination of an interval during which to perform the haptic sensation presentation and an interval during which not to perform the haptic sensation presentation. Further, by generating the reproduction enabled/disabled information according to analysis results, the haptic sensation presentation can be performed in synchronization with the content data.

The analysis processing section in the transmission apparatus described above may determine whether to enable or disable reproduction of the haptic sensation signal for each piece of acoustic frame data obtained by separating the acoustic signal into predetermined lengths of time, and the transmission processing section may perform the transmission with each piece of the acoustic frame data associated with the reproduction enabled/disabled information.

With the reproduction enabled/disabled information set for each piece of acoustic frame data, intervals during which to generate the haptic sensation signal can finely be set.

The transmission apparatus described above may include an encoding section configured to generate encoded data including the acoustic frame data and the reproduction enabled/disabled information corresponding to the acoustic frame data, and the transmission processing section may transmit the encoded data in the transmission.

Thus, standardized encoded data ED having a predetermined data structure is transmitted.

The analysis processing section in the transmission apparatus described above may generate the reproduction enabled/disabled information on the basis of an analysis result of the acoustic signal.

This allows determination of whether or not performing the haptic sensation presentation in synchronization with the acoustic signal is appropriate.

In the transmission apparatus described above, the content data may include moving image data to be reproduced in synchronization with the acoustic signal, and the analysis processing section may execute analysis processing on the moving image data, and on the basis of an analysis result of the moving image data, generate the reproduction enabled/disabled information.

In a case where the content data includes a video, a haptic stimulus may preferably be presented to the user not only in synchronization with sounds but also in synchronization with the video. According to the present configuration, the analysis processing is executed on the moving image data to allow determination of whether or not to present the haptic stimulus in the scene in synchronization with the video.

The analysis processing section in the transmission apparatus described above may generate the reproduction enabled/disabled information on the basis of spectral flatness in the acoustic frame data.

Hence, whether or not to perform the haptic sensation presentation can be determined using the spectral flatness itself in the acoustic frame data, the rate of increase in spectral flatness, or the like. This enables an increase in the possibility of performing appropriate haptic sensation presentation.

The analysis processing section in the transmission apparatus described above may generate the reproduction enabled/disabled information on the basis of a total value of power spectra of frequency components equal to or less than a threshold in the acoustic frame data.

Hence, it is possible to determine whether or not to perform the haptic sensation presentation, on the basis of the total value of power spectra of low frequency components in the acoustic frame data, the rate of increase in the total value, or the like.

The analysis processing section in the transmission apparatus described above may generate the reproduction enabled/disabled information on the basis of a total value of luminance values of a plurality of pixels in the moving image data.

This allows detection of a scene, such as an explosion scene, which involves a significant change in luminance value.

The analysis processing section in the transmission apparatus descried above may generate the reproduction enabled/disabled information on the basis of whether or not the face of a person with a predetermined size or larger is detected in the moving image data.

For example, a scene with a close-up of the face of a person is inferred to be a scene with the person talking. For such a scene, if the haptic sensation presentation is performed in response to the talking voice of the person, the user may feel uncomfortable. To avoid this, in a case where a scene with a close-up of the face of a person is detected, the haptic sensation presentation is determined not to be performed.

An information processing method according to the present technology, executed by a computer apparatus, includes processing of receiving data including an acoustic signal and reproduction enabled/disabled information for a haptic sensation signal, generating the haptic sensation signal on the basis of the received acoustic signal in a case where the reproduction enabled/disabled information indicates that reproduction is enabled, and determining not to generate the haptic sensation signal in a case where the reproduction enabled/disabled information indicates that reproduction is disabled.

An information processing method according to the present technology, executed by a computer apparatus, includes processing of executing analysis processing on content data including at least an acoustic signal and generating reproduction enabled/disabled information indicating whether to enable or disable reproduction of a haptic sensation signal, and transmitting the reproduction enabled/disabled information and the acoustic signal.

A program according to the present technology causes an arithmetic processing apparatus to execute functions of receiving data including an acoustic signal and reproduction enabled/disabled information for a haptic sensation signal, generating the haptic sensation signal on the basis of the received acoustic signal in a case where the reproduction enabled/disabled information indicates that reproduction is enabled, and determining not to generate the haptic sensation signal in a case where the reproduction enabled/disabled information indicates that reproduction is disabled.

A program according to the present technology causes an arithmetic processing apparatus to execute functions of executing analysis processing on content data including at least an acoustic signal and generating reproduction enabled/ disabled information indicating whether to enable or disable reproduction of a haptic sensation signal, and transmitting the reproduction enabled/disabled information and the acoustic signal.

Such information processing methods and programs facilitate implementation of the transmission apparatus and the reception apparatus according to the present technology.

BRIEF DESCRIPTION OF DRAWINGS

FIG. 1 is a schematic diagram depicting a configuration example of a haptic sensation presentation system.

FIG. 2 is a schematic diagram depicting aspects of a transmission apparatus and a reception apparatus for using VOD content data to implement acoustic output and haptic sensation presentation.

FIG. 4 is a schematic diagram depicting aspects of a transmission apparatus and a reception apparatus for using content data stored in a recording medium, to implement acoustic output and haptic sensation presentation.

FIG. 5 is a schematic diagram depicting aspects of a transmission apparatus and a reception apparatus for implementing acoustic output and haptic sensation presentation for game content.

FIG. 6 is a diagram illustrating an example of a data structure of encoded data.

FIG. 7 is a block diagram for illustrating a configuration example of a transmission apparatus.

FIG. 8 is a diagram for illustrating a functional configuration example of an analysis processing section.

FIG. 9 is a block diagram for illustrating a configuration example of a reception apparatus.

FIG. 10 is a diagram for illustrating a functional configuration example of a decoding section.

FIG. 11 is a graph depicting a power spectrum of acoustic frame data not subjected to processing by a low pass filter yet.

FIG. 13 is a diagram illustrating an example of a haptic sensation signal not subjected to fade-in processing or fade-out processing yet.

FIG. 17 is a diagram for describing scene information.

FIG. 18 is a diagram for describing correspondence between scene type IDs and scene contents.

DESCRIPTION OF EMBODIMENTS

Figure 3:
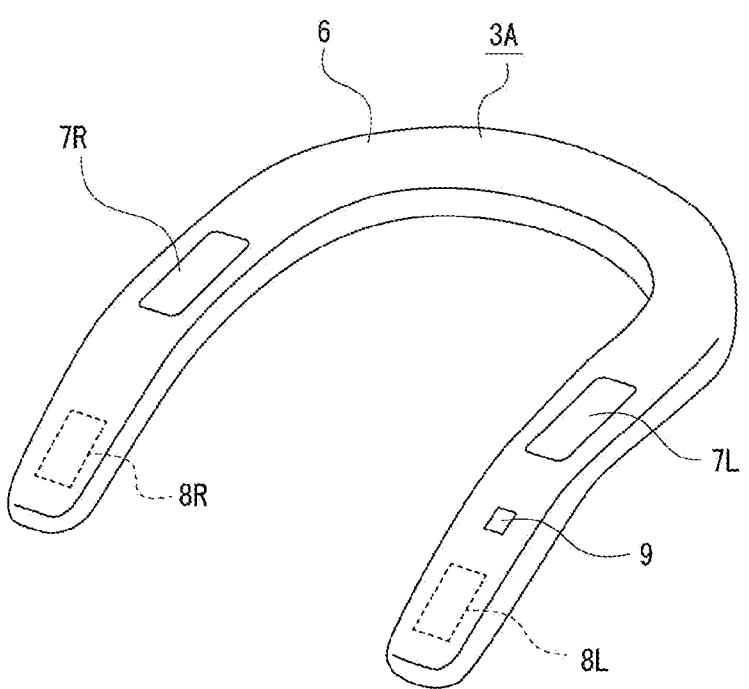
FIG. 3 is a perspective view of a neck band speaker.

With reference to the accompanied drawings, embodiments of the present technology will be described in the following order.

<1. System Configuration>
<2. Data Structure of Encoded Data>
<3. Configuration of Transmission Apparatus>
<4. Configuration of Reception Apparatus>
<5. Processing Flow>
<5-1. Processing Flow of Transmission Apparatus>
<5-2. Processing Flow of Reception Apparatus>
<6. Variations>
<7. Conclusion>
<8. Present Technology>

1. SYSTEM CONFIGURATION

An overview of a configuration of a haptic sensation presentation system 1 according to the present technology will be described with reference to FIG. 1.

The haptic sensation presentation system 1 executes various processing operations to present a haptic sensation to a user. Here, the haptic sensation presentation means reproducing a haptic sensation signal to provide a haptic stimulus to the user.

The haptic sensation presentation system 1 includes a transmission apparatus 2, a reception apparatus 3, an acoustic reproduction apparatus 4, and a haptic sensation reproduction apparatus 5.

The transmission apparatus 2 executes processing of acquiring content data CD including an acoustic signal and acquiring the acoustic signal from the content data CD. Additionally, the transmission apparatus 2 executes processing of dividing the acoustic signal thus acquired into pieces of acoustic frame data SFD corresponding to the acoustic signal separated into predetermined lengths of time. The predetermined length of time is assumed to be a relatively short period of time, for example, several tens of msec.

The transmission apparatus 2 executes encoding processing on each piece of acoustic frame data SFD to generate encoded data ED. The transmission apparatus 2 transmits the encoded data ED to the reception apparatus 3.

Additionally, as described below, the encoded data ED includes reproduction enabled/disabled information indicating whether or not to reproduce a haptic sensation signal synchronized with the acoustic frame data SFD having a reproduction length of the predetermined length of time. The reproduction enabled/disabled information may be generated by analysis processing executed on each piece of acoustic frame data SFD by the transmission apparatus 2, or may be generated by analysis processing executed on the basis of other data separation units.

The reproduction enabled/disabled information is assumed to be information of either 1 indicating that reproduction is enabled or 0 indicating that reproduction is disabled, and may be, for example, flag information including 1 bit. In the description below, flag information including 1 bit is used as an aspect of the reproduction enabled/disabled information, and the reproduction enabled/disabled information is described as the "haptic sensation reproduction flag PF."

Note that, in a case where the content data CD includes a video signal, the haptic sensation reproduction flag PF may be generated on the basis of partial moving image data corresponding to a video signal to be reproduced in synchronization with the acoustic frame data SFD.

That is, whether or not to provide a haptic sensation to the user is determined on the basis of the acoustic signal or the video signal in the content data CD.

Note that the transmission apparatus 2 may acquire, from another information processing apparatus, the content data CD including the acoustic signal, may acquire the content data CD including the acoustic signal by reading the content data CD from a recording medium, or may acquire the content data CD including the acoustic signal, from a storage section provided inside the transmission apparatus 2.

The reception apparatus 3 acquires the acoustic signal and the reproduction enabled/disabled information by executing decoding processing on the encoded data ED received from the transmission apparatus 2.

The reception apparatus 3 implements acoustic output to the user by transmitting the acoustic signal to the acoustic reproduction apparatus 4.

Additionally, the reception apparatus 3 generates a haptic sensation signal on the basis of the haptic sensation reproduction flag PF as the reproduction enabled/disabled information and transmits the haptic sensation signal to the haptic sensation reproduction apparatus 5 to achieve haptic sensation presentation to the user.

The acoustic reproduction apparatus 4 is assumed to be an apparatus that provides acoustic output based on the acoustic signal, for example, earphones, headphones, or a speaker apparatus.

The haptic sensation reproduction apparatus 5 is an apparatus that provides output for providing the user with a haptic stimulus based on the haptic sensation signal, and may be in various forms, for example, an apparatus including a vibration section, an apparatus including a function of blowing water, air, or the like to the user, an apparatus including a heating section, and the like. As an example, an apparatus including a vibration section mainly including a vibrator or an actuator will be described below.

Note that the acoustic reproduction apparatus 4 and the haptic sensation reproduction apparatus 5 may be provided as apparatuses different from and independent of the reception apparatus 3, or that one of or both the acoustic reproduction apparatus 4 and the haptic sensation reproduction apparatus 5 may be provided integrally with the reception apparatus 3 as an acoustic output section and a haptic sensation reproduction section.

Now, several examples of more specific forms of the transmission apparatus 2 and the reception apparatus 3 will be described.

FIG. 2 depicts aspects of a transmission apparatus 2A and a reception apparatus 3A for implementing acoustic output and haptic sensation presentation using VOD (Video On Demand) content data CD. The transmission apparatus 2A is assumed to be a smartphone, a tablet terminal, a television receiver, a PC (Personal Computer), or the like. The transmission apparatus 2A receives content data CD from a content server 100, generates encoded data ED, and transmits the encoded data ED thus generated to a neck band speaker as the reception apparatus 3A.

FIG. 3 depicts a configuration example of the reception apparatus 3A as the neck band speaker.

The reception apparatus 3A as the neck band speaker is assumed to be a speaker apparatus worn around the neck and includes an acoustic output section 7L disposed on a left portion of a housing 6 and an acoustic output section 7R disposed on a right portion of the housing 6.

Additionally, the reception apparatus 3A includes a haptic sensation reproduction section 8L disposed at a left tip portion of the housing 6 and a haptic sensation reproduction section 8R disposed at a right tip portion of the housing 6.

Further, the reception apparatus 3A includes various operators 9 such as a power button.

The acoustic output sections 7L and 7R correspond to an aspect of the acoustic reproduction apparatus 4. Additionally, the haptic sensation reproduction sections 8L and 8R correspond to an aspect of the haptic sensation reproduction apparatus 5.

The reception apparatus 3A outputs, to the acoustic output sections 7L and 7R, acoustic frame data SFD acquired by executing decoding processing. Additionally, the reception apparatus 3A generates a haptic sensation signal from the acoustic frame data SFD on the basis of the haptic sensation reproduction flag PF acquired and outputs the haptic sensation signal to the haptic sensation reproduction sections 8L and 8R.

That is, in the aspect depicted in FIG. 2, while viewing an image displayed on a display section (including a monitor apparatus connected to the transmission apparatus 2A) provided in the transmission apparatus 2A, the user listens to sounds output from the acoustic output sections 7L and 7R provided in the reception apparatus 3A and feels vibration stimuli reproduced in the haptic sensation reproduction sections 8L and 8R, enjoying the content.

FIG. 4 depicts aspects of a transmission apparatus 2B and a reception apparatus 3B for implementing acoustic output and haptic sensation presentation using the content data CD stored in a recording medium RM assumed to be a CD-ROM (Compact Disc Read Only Memory), a DVD (Digital Versatile Disc), a BD (Blu-ray Disc (registered trademark)), or the like.

The transmission apparatus 2B is assumed to be a reading device or a reproduction device for the recording medium RM or the like and transmits a video signal stored in the recording medium RM to a monitor apparatus 10, and the monitor apparatus 10 displays the video.

The transmission apparatus 2B generates encoded data ED on the basis of an acoustic signal stored in the recording medium RM and transmits the encoded data ED to the reception apparatus 3B.

The reception apparatus 3B is assumed to be an acoustic reproduction apparatus such as headphones or earphones which include the acoustic output sections 7L and 7R, and executes reproduction processing on the acoustic frame data.

Additionally, the reception apparatus 3B includes no haptic sensation reproduction section, and generates a haptic sensation signal on the basis of the haptic sensation reproduction flag PF and transmits the haptic sensation signal to a haptic sensation reproduction apparatus 5B shaped like a bracelet, a vest, or the like.

The haptic sensation reproduction apparatus 5B executes reproduction processing on the received haptic sensation signal to perform haptic sensation presentation.

That is, in the aspects depicted in FIG. 4, while viewing an image displayed on the monitor apparatus 10 connected to the transmission apparatus 2B, the user listens to sounds output from the acoustic output sections 7L and 7R provided in the reception apparatus 3B and feels a vibration stimulus reproduced in the haptic sensation reproduction apparatus 5B, enjoying the content.

FIG. 5 depicts aspects of a transmission apparatus 2C and a reception apparatus 3C for implementing acoustic output and haptic sensation presentation for the user enjoying a game.

The transmission apparatus 2C is an apparatus that is assumed to be a game machine body and reproduces game data stored in the recording medium RM or an internal storage section. The transmission apparatus 2C transmits a video signal contained in the game data to the monitor apparatus 10 (or a television receiver) connected to the transmission apparatus 2C, and the monitor apparatus 10 displays the video.

The transmission apparatus 2C generates encoded data ED on the basis of an acoustic signal contained in the game data and transmits the encoded data ED to the reception apparatus 3C.

The reception apparatus 3C is assumed to be a game controller including a haptic sensation reproduction section 8 or the like and reproduces a haptic sensation signal generated on the basis of the haptic sensation reproduction flag PF from acoustic frame data contained in the encoded data ED.

The reception apparatus 3C acquires the acoustic frame data included in the encoded data ED and transmits the acoustic frame data to an acoustic reproduction apparatus 4C assumed to be earphones, headphones, or the like.

The acoustic reproduction apparatus 4C performs acoustic output by reproducing the received acoustic frame data.

That is, in the aspects depicted in FIG. 5, while viewing an image displayed on the monitor apparatus 10 connected to the transmission apparatus 2C, the user feels a vibration stimulus reproduced in the haptic sensation reproduction section provided in the reception apparatus 3C, and listens to a sound output from the acoustic reproduction apparatus 4C, enjoying the content.

Additionally, in the aspect depicted in FIG. 5, the user can be made to feel a haptic stimulus corresponding to motion of a character that is moved by an operation of the user, so that the user can feel more immersive in the game.

2. DATA STRUCTURE OF ENCODED DATA

A data structure of the encoded data ED for one frame will be described with reference to FIG. 6.

The encoded data ED is assumed to have a data structure for transmitting the acoustic frame data SFD. Specifically, data structures available include SBC (Sub Band Coding), MP3 (MPEG1 Audio Layer-III), AAC (Advanced Audio Coding), LDAC, and the like.

The encoded data ED includes a header region 20 and a payload region 21. Additionally, the encoded data ED may further include a check region.

The header region 20 includes a sync word region 22, a bit rate region 23, a sampling rate region 24, a channel mode region 25, and a reserved region 26.

The sync word region 22 is a region in which a particular bit string is saved in order to detect the head of the encoded data ED for one frame. For example, a bit string such as 0xFFFE is saved in the sync word region 22. Note that "0x" indicates a hexadecimal number, and 0xFFFE is assumed to be a 16-bit bit string in which only the last bit (LSB: Least Significant Bit) is "0."

The bit rate region 23 is a region in which a bit rate ID (Identification) is saved. The bit rate ID, for example, includes a bit string including 2 bits to specify a bit rate representing the amount of data per second in the acoustic frame data SFD.

Specifically, the bit rate ID takes any value ranging from 0 to 3. A bit rate ID of "0" indicates 32 kbps, a bit rate ID of "1" indicates 64 kbps, a bit rate ID of "2" indicates 96 bps, and a bit rate ID of "3" indicates 128 kbps.

The sampling rate region 24 is a region in which a sampling rate ID is saved. The sampling rate ID, for example, includes a bit string including 2 bits to specify a sampling rate representing the number of samples per second in the acoustic frame data SFD.

Specifically, the sampling rate ID takes any value ranging from 0 to 3. A sampling rate ID of "0" indicates 12 kHz, a sampling rate ID of "1" indicates 24 kHz, a sampling rate ID of "2" indicates 48 kHz, and a sampling rate ID of "3" indicates 96 KHz.

The channel mode region 25 is a region in which a channel mode ID is saved. The channel mode ID, for example, includes a bit string including 2 bits to specify a combination of channels for the acoustic frame data SFD.

Specifically, the channel mode ID takes any value ranging from 0 to 3. A channel mode ID of "0" indicates that the acoustic frame data SFD is a monaural signal, a channel mode ID of "1" indicates that the acoustic frame data SFD is a stereo signal, a channel mode ID of "2" indicates that the acoustic frame data SFD is a 5.1 channel surround signal, and a channel mode ID of "3" indicates that the acoustic frame data SFD is a 7.1 channel surround signal.

The reserved region 26 is a region prepared for future function enhancement and is provided to implement function enhancement without changing the data structure.

The reserved region 26 may be a region having any size of 1 bit, 2 bits, 4 bits, or the like.

In the present embodiment, the haptic sensation reproduction flag PF is stored in the reserved region 26. Note that, for implementation of the present embodiment, the reserved region 26 may be a 1-bit region. That is, if the haptic sensation reproduction flag PF is flag information including 1 bit, the present embodiment can be implemented even in a case where the reserved region 26 is a 1-bit region. Additionally, this aspect allows the encoded data ED to have a minimum data structure, allowing suppression of an increase in communication band required during transmission or reception of the encoded data ED.

3. CONFIGURATION OF TRANSMISSION APPARATUS

A configuration of the transmission apparatus 2 will be described with reference to FIG. 7.

The transmission apparatus 2 includes an analysis processing section 30, an encoding section 31, a storage section 32, a control section 33, a communication section 34, and a bus 35.

The analysis processing section 30 executes analysis processing on the content data CD input via the communication section 34. Note that, in the description below, the content data CD includes an acoustic signal and moving image data, by way of example.

The analysis processing section 30 executes decoding processing in a case where the content data CD is encoded. In the decoding processing, the moving image data and the acoustic signal are retrieved from the content data CD.

The retrieved moving image data and acoustic signal are subjected to analysis processing for each piece of partial moving image data having a predetermined length of time and each piece of acoustic frame data SFD having a predetermined length of time.

In the partial moving image data analysis processing, whether or not a scene is appropriate for haptic sensation presentation is determined on the basis of each piece of image data included in the partial moving image data. This will be specifically described below.

In the analysis processing on the acoustic frame data SFD, whether or not a scene is appropriate for haptic sensation presentation is determined on the basis of a spectral value for the acoustic signal as the acoustic frame data SFD or the like. This will be specifically described below.

The analysis processing section 30 executes analysis processing on the basis of at least one of the partial moving image data MD or the acoustic frame data SFD and generates a haptic sensation reproduction flag PF according to the result of the analysis processing. Specifically, in a case where the scene is determined to be appropriate for haptic sensation presentation, the haptic sensation reproduction flag PF is set to "1" indicating that reproduction is enabled. On the other hand, in a case where the scene is determined to be inappropriate for haptic sensation presentation, the haptic sensation reproduction flag PF is set to "0" indicating that reproduction is disabled.

The encoding section 31 executes encoding processing using the acoustic frame data SFD and the haptic sensation reproduction flag PF which are generated by the analysis processing section 30. The encoding processing includes generating encoded data ED including information concerning the acoustic frame data SFD and the haptic sensation reproduction flag PF. Various encoding schemes may be used for encoding. However, any existing scheme may be used as long as the scheme is used to transmit the acoustic frame data SFD and enables the haptic sensation reproduction flag PF to be saved in an unused region such as the reserved region 26.

This allows saving of the effort to develop a new encoding scheme for encoding the haptic sensation reproduction flag PF and the like.

Note that real data of the encoded data ED may be one obtained by subjecting the acoustic frame data SFD to encoding processing such as compression.

The storage section 32 includes an HDD (Hard Disk Drive), an SSD (Solid State Drive), and the like and stores various types of information such as the content data CD not subjected to analysis by the analysis processing section 30 yet and the haptic sensation reproduction flag PF obtained as a result of the analysis.

The control section 33 includes a microcomputer including a CPU (Central Processing Unit), a ROM (Read Only Memory), a RAM (Random Access Memory), and the like and executes various processing operations in accordance with programs stored in the ROM to integrally control the transmission apparatus 2.

The communication section 34 performs wired or wireless data communication with another information processing apparatus. The communication section 34 executes processing for receiving the content data CD from the other information processing apparatus, processing for transmitting the encoded data ED to the reception apparatus 3, and the like.

Note that the analysis processing section 30, the encoding section 31, the storage section 32, the control section 33, and the communication section 34 are connected together in a communicatable manner via the bus 35.

Here, a specific functional configuration of the analysis processing section 30 is depicted in FIG. 8.

The analysis processing section 30 includes an input adjustment section 40, a moving image data analysis section 41, an acoustic analysis section 42, a haptic sensation reproduction determination section 43, and an output adjustment section 44.

The input adjustment section 40 executes processing for decoding the content data CD input to the transmission apparatus 2 and processing for retrieving the moving image data and acoustic signal included in the content data CD.

Further, the input adjustment section 40 executes processing for dividing the retrieved moving image data into pieces of partial moving image data MD corresponding to data having a predetermined length of time, and processing for dividing the retrieved acoustic signal into pieces of acoustic frame data SFD corresponding to data having a predetermined length of time.

The input adjustment section 40 outputs, to the moving image data analysis section 41, the partial moving image data MD resulting from the division and outputs, to the acoustic analysis section 42, the acoustic frame data SFD resulting from the division.

The moving image data analysis section 41 executes image analysis on the partial moving image data MD and calculates a feature amount for each piece of partial moving image data MD.

Several examples of the feature amount to be calculated are provided below.

The moving image data analysis section 41 calculates a feature amount for determining whether or not a scene involves instantaneous blinking of light.

For example, the moving image data analysis section 41 calculates the total of luminance values for all pixels in each frame included in the partial moving image data MD to obtain a feature amount A. An image frame with a large feature amount A is an image depicting a bright scene and is hence likely to be an image catching a scene of an explosion.

[Equation 1] for calculating the feature amount A is provided below.

[Math. 1]

$$A = \sum_{m=0}^{M-1} p(m) \qquad \text{[Equation 1]}$$

Here, in [Equation 1], p(m) represents the m-th luminance value in a pixel row p, and M represents the number of pixels.

Additionally, the moving image data analysis section 41 calculates, as a feature amount B, a change in luminance value between image frames adjoining in a time direction.

For example, by calculating the feature amount B in such a manner that, with respect to a preceding image frame, the feature amount B increases as the rate of increase in total of luminance values for all pixels rises, an image frame depicting the moment when an explosion started can be identified.

[Equation 2] for calculating the feature amount B is provided below.

[Math. 2]

$$B = \frac{A - A'}{A}$$ [Equation 2]

Here, in [Equation 2], A' is the feature amount A calculated for the preceding image frame and represents the total of the luminance values for all pixels in the preceding image frame.

As another example, the moving image data analysis section 41 may calculate a feature amount for identifying a scene inappropriate for haptic sensation presentation. For example, in a scene depicting a close-up of the face of a person, the scene being intended to gather attention to the spoken lines or facial expression of the person, haptic sensation presentation may make the user feel like being shaken in synchronization with the spoken lines of the person and feel uncomfortable even in a case where an explosion is occurring behind the user.

Thus, the moving image data analysis section 41 calculates a feature amount C in such a manner that the feature amount C decreases as the ratio of an image region corresponding to the face of the person to the image region of the image frame rises. That is, even in a case where the feature amount A and feature amount B described above are large, indicating that the image frame is likely to correspond to partial moving image data catching a scene of an explosion, haptic sensation presentation can be determined not to be performed in a case where the feature amount C is calculated to be small because the scene is a close-up of the face of the person.

The acoustic analysis section 42 performs acoustic analysis on the acoustic frame data SFD and calculates a feature amount for each piece of acoustic frame data SFD.

Several examples of the feature amount to be calculated are provided below.

The acoustic analysis section 42 calculates a feature amount for determining whether or not a hit sound, a crashing sound, an explosion sound, a sword fighting sound, or the like is being emitted.

For example, spectral flatness for the acoustic frame data SFD is calculated to obtain a feature amount D. The hit sound, the crashing sound, and the like are characterized to have high spectral flatness, and by calculating the feature amount D in such a manner that the feature amount D increases as the spectral flatness rises, the scene can be determined to involve a hit sound, a crashing sound, or the like.

[Equation 3] for calculating the feature amount D is provided below.

[Math. 3]

$$D = \frac{\sqrt[N]{\prod_{n=0}^{N-1} x(n)}}{\frac{\sum_{n=0}^{N-1} x(n)}{N}}$$ [Equation 3]

14

Here, in [Equation 3], x(n) denotes the n-th crest value in a signal train x, and the N represents the number of signal samples.

Additionally, the acoustic analysis section 42 calculates a feature amount on the basis of the rate of increase in spectral flatness for a preceding piece of acoustic frame data SFD.

For example, the acoustic analysis section 42 calculates a feature amount E in such a manner that the feature amount E increases as the rate of increase in spectral flatness for the acoustic frame data SFD rises.

Instead of using only the feature amount D, additionally using the feature amount E can enhance the possibility of identifying a scene involving a hit sound, a crashing sound, or the like.

[Equation 4] for calculating the feature amount E is provided below.

[Math. 4]

$$E = \frac{D - D'}{D}$$ [Equation 4]

Here, in [Equation 4], D' is the feature amount D calculated for the preceding acoustic frame data SFD and represents the spectral flatness in the preceding acoustic frame data SFD.

The acoustic analysis section 42 calculates a feature amount based on a deep bass. Specifically, the acoustic analysis section 42 calculates a feature amount F in such a manner that the feature amount F increases as the total value of power spectra each having 100 Hz or less for the acoustic frame data SFD increases. The deep bass is often generated in a scene involving an impact, and haptic sensation presentation based on the deep bass is likely to be appropriate.

[Equation 5] for calculating the feature amount F is provided below.

[Math. 5]

$$F = \sum_{k=0}^{K} |X(k)|^2$$ [Equation 5]

Here, in [Equation 5], X(k) represents the kth spectrum in a signal train X, and K represents a spectrum bin (BIN) corresponding to 100 Hz.

Additionally, the acoustic analysis section 42 calculates a feature amount on the basis of the rate of increase in the total value of power spectra each having 100 Hz or less for the preceding acoustic frame data SFD.

For example, the acoustic analysis section 42 calculates a feature amount G in such a manner that the feature amount G increases as the rate of increase in the total value of power spectra each having 100 Hz or less for the acoustic frame data SFD rises.

Instead of using only the feature amount F, additionally using the feature amount G allows identification of a scene in which a deep base is generated, especially, a scene in which a deep bass has just started to be generated, enabling such effective haptic sensation presentation that the haptic sensation presentation starts to be performed simultaneously with generation of a deep bass.

[Equation 6] for calculating the feature amount G is provided below.

[Math. 6]

$$G = \frac{F - F'}{F} \qquad \text{[Equation 6]}$$

Here, in [Equation 6], F' is the feature amount F calculated for the preceding acoustic frame data SFD and represents the total value of power spectra of low frequency bands (for example, 100 Hz or less) in the preceding acoustic frame data SFD.

The haptic sensation reproduction determination section 43 executes processing for determining whether or not to perform haptic sensation presentation in synchronization with the partial moving image data MD or the acoustic frame data SFD, and setting the haptic sensation reproduction flag PF for each piece of acoustic frame data SFD on the basis of the determination result. Specifically, the haptic sensation reproduction determination section 43 calculates an evaluation value EV on the basis of the feature amounts A, B, and C calculated by the moving image data analysis section 41 and the feature amounts D, E, F, and G calculated by the acoustic analysis section 42.

The evaluation value EV is, for example, calculated on the basis of [Equation 7] provided below.

Evaluation value $EV = W1 \cdot$ feature amount $A + W2 \cdot$ feature amount $B + W3 \cdot$ feature amount $C + W4 \cdot$ feature amount $D + W5 \cdot$ feature amount $E + W6 \cdot$ feature amount $F + W7 \cdot$ feature amount $G$    [Equation 7]

Here, in [Equation 7], W1 to W7 are assumed to be coefficients representing weights for the respective feature amounts A to G.

Further, the haptic sensation reproduction determination section 43 sets the haptic sensation reproduction flag PF on the basis of the evaluation value EV. Specifically, in a case where the evaluation value EV is equal to or greater than a threshold TH, the haptic sensation reproduction flag PF is set to "1." In a case where the evaluation value EV is less than the threshold TH, the haptic sensation reproduction flag PF is set to "0."

By appropriately adjusting the coefficients of the weights W1 to W7, the haptic sensation reproduction flag PF can be set to "1" for a scene for which haptic sensation presentation should be performed.

The output adjustment section 44 outputs the acoustic frame data SFD having a specific length of time obtained by the input adjustment section 40 and the haptic sensation reproduction flag PF set by the haptic sensation reproduction determination section 43.

4. CONFIGURATION OF RECEPTION APPARATUS

A configuration of the reception apparatus 3 will be described with reference to FIG. 9.

The reception apparatus 3 includes a decoding section 50, DACs (Digital to Analog Converters) 51 and 52, amplifiers 53 and 54, a storage section 55, a control section 56, a communication section 57, and a bus 58.

The decoding section 50 executes decoding processing on the encoded data ED input to the reception apparatus 3 and acquires the acoustic frame data SFD and the haptic sensation reproduction flag PF.

The decoding section 50 checks the haptic sensation reproduction flag PF thus acquired and generates a haptic sensation signal from the acoustic frame data SFD only in a case where the haptic sensation reproduction flag PF is "1" indicating that reproduction is enabled.

The decoding section 50 outputs, to the DAC 51, the acoustic frame data SFD acquired from the encoded data ED and outputs the generated haptic sensation signal to the DAC 52.

The DAC 51 converts the acoustic frame data SFD, in the form of a digital signal, into an analog signal and outputs the analog signal to the subsequent amplifier 53.

Similarly, the DAC 52 converts the haptic sensation signal, in the form of a digital signal, into an analog signal and outputs the analog signal to the subsequent amplifier 54.

The amplifier 53 outputs, to the acoustic reproduction apparatus 4, the acoustic signal converted into an analog signal.

Additionally, the amplifier 54 outputs, to the haptic sensation reproduction apparatus 5, the haptic sensation signal converted into an analog signal.

Note that the DACs 51 and 52 and the amplifiers 53 and 54 may both be provided inside the acoustic reproduction apparatus 4 or the haptic sensation reproduction apparatus 5. In this case, the acoustic frame data SFD and the haptic sensation signal, in the form of digital signals, are respectively transmitted to the acoustic reproduction apparatus 4 and the haptic sensation reproduction apparatus 5.

The storage section 55 includes an HDD, an SSD, and the like, and may store the encoded data ED not subjected to the decoding processing by the decoding section 50 yet and the like, or may store the data concerning the acoustic frame data SFD and the data concerning the haptic sensation reproduction flag PF, which are retrieved from the encoded data ED, and the data concerning the generated haptic sensation signal.

The control section 56 includes a microcomputer including a CPU, a ROM, a RAM, and the like and executes various processing operations in accordance with programs stored in the ROM, to integrally control the reception apparatus 3.

The communication section 57 executes reception processing for the encoded data ED, transmission processing for the acoustic signal as an analog signal amplified by the amplifier 53, and transmission processing for the haptic sensation signal as an analog signal amplified by the amplifier 54. The communication section 57 is assumed to be capable of establishing wired communication and wireless communication.

Note that, as described above, in a case where the acoustic output section 7 or the haptic sensation reproduction section 8 is provided inside the reception apparatus 3, the acoustic signal converted into an analog signal may be output to the acoustic output section 7 or the haptic sensation signal converted into an analog signal may be output to the haptic sensation reproduction section 8.

Note that the decoding section 50, the storage section 55, the control section 56, and the communication section 57 are connected together in a communicatable manner via the bus 58.

Here, a specific functional configuration of the decoding section 50 is depicted in FIG. 10.

The decoding section 50 includes an acoustic decoding section 60 and a haptic sensation signal generation section 61.

The acoustic decoding section 60 executes composite processing on the encoded data ED input thereto, to acquire the acoustic frame data SFD and the haptic sensation reproduction flag PF.

The haptic sensation signal generation section 61 generates a haptic sensation signal by using the acoustic frame data SFD with the haptic sensation reproduction flag PF set to "1" indicating that reproduction is enabled. That is, the haptic sensation signal generation section 61 does not generate a haptic sensation signal for the acoustic frame data SFD with the haptic sensation reproduction flag PF set to "0" indicating that reproduction is disabled.

Now, a technique for generating a haptic sensation signal from the acoustic frame data SFD will be described below. Various methods may be used to generate a haptic sensation signal, but one example will be described with reference to FIG. 11 and FIG. 12.

The haptic sensation signal generation section 61 executes signal processing with a low pass filter or the like to extract only low frequency components of the acoustic signal and treats the low frequency components as a haptic sensation signal.

Figure 11:
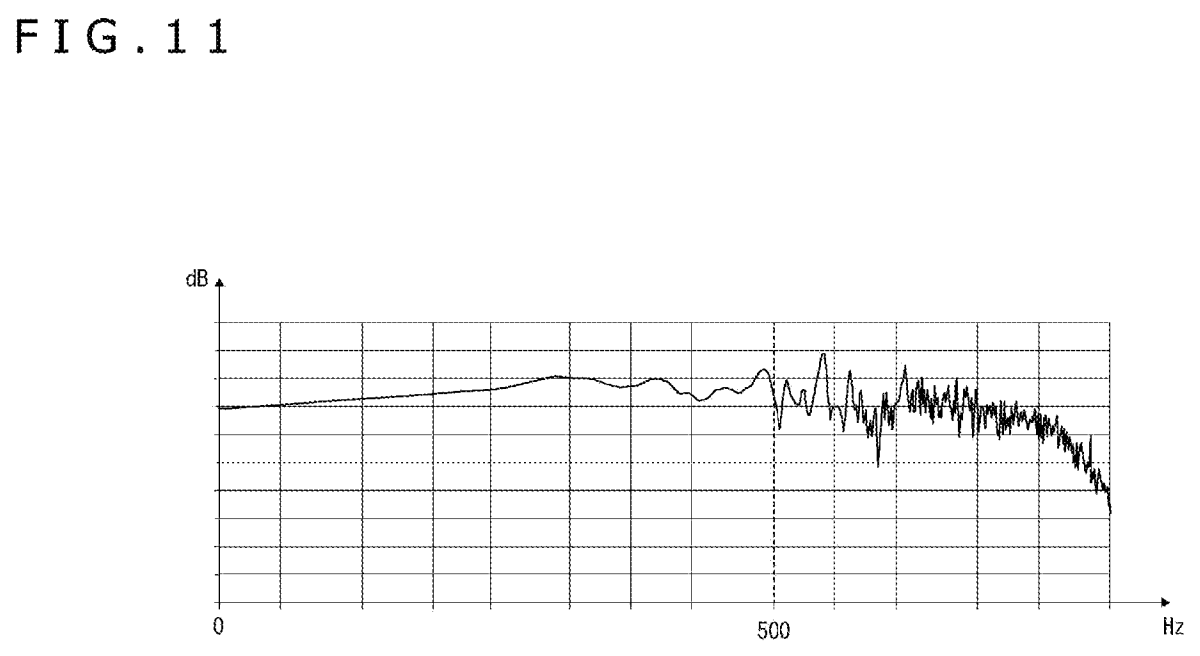

FIG. 11 is a graph depicting a power spectrum of the acoustic frame data SFD and illustrating a signal not subjected to low pass filter processing yet.

Figure 12:
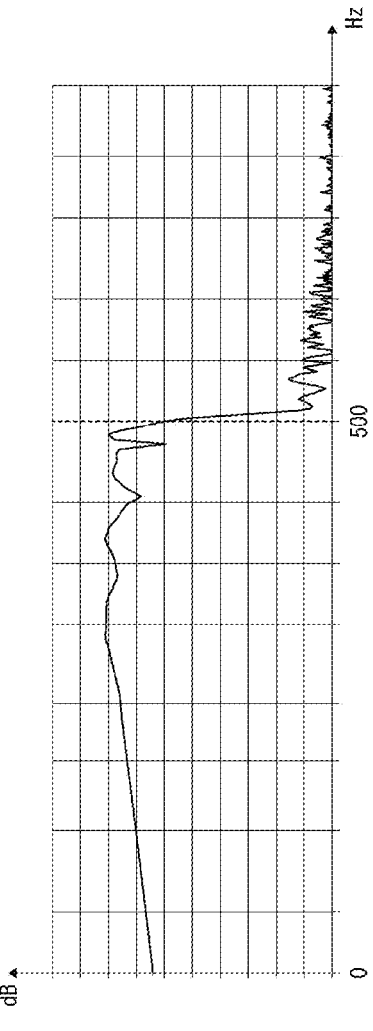
FIG. 12 is a graph depicting a power spectrum of acoustic frame data subjected to processing by the low pass filter.

FIG. 12 is a graph depicting a power spectrum of the acoustic frame data SFD as with FIG. 11 but illustrating a signal subjected to low pass filter processing with a cutoff frequency of 500 Hz.

The haptic sensation signal generation section 61 treats, as a haptic sensation signal, the signal illustrated in FIG. 12. In such a manner, by generating a haptic sensation signal on the basis of the acoustic frame data SFD as an acoustic signal, haptic sensation presentation can be performed that is compatible with sounds heard by the user.

Note that the haptic sensation signal generation section 61 further executes fade-in processing and fade-out processing on the haptic sensation signal illustrated in FIG. 11. In a case where the acoustic frame data SFD with the haptic sensation reproduction flag PF set to "0" and the acoustic frame data SFD with the haptic sensation reproduction flag PF set to "1" are consecutively reproduced, a haptic stimulus presented to the user rapidly transitions from OFF to ON. In this case, unintended vibration may occur due to a transient response of the haptic sensation reproduction apparatus 5 or the haptic sensation reproduction section 8. This also applies to consecutive reproduction of the acoustic frame data SFD with the haptic sensation reproduction flag PF set to "1" and the acoustic frame data SFD with the haptic sensation reproduction flag PF set to "0."

To avoid occurrence of unnecessary vibration, fade-in processing and fade-out processing are executed in a case where the haptic sensation reproduction flag PF for the acoustic frame data SFD changes.

First, an example of a haptic sensation signal not subjected to fade-in processing and fade-out processing yet is illustrated in FIG. 13. FIG. 13 depicts a plurality of pieces of acoustic frame data SFD as an acoustic signal, the haptic sensation reproduction flag PF corresponding to the acoustic frame data SFD, and the haptic sensation signal not subjected to fade processing yet, arranged in this order from above.

In a case where intervals are labeled as T1, T2, T3, T4, and T5 in the order of reproduction from the left, starting with the earliest, then as depicted in FIG. 13, presentation of a haptic stimulus is suddenly started at a timing when the interval T1 transitions to the interval T2, and the presentation of the haptic stimulus is suddenly ended at a timing when the interval T3 transitions to the interval T4.

Figure 14:
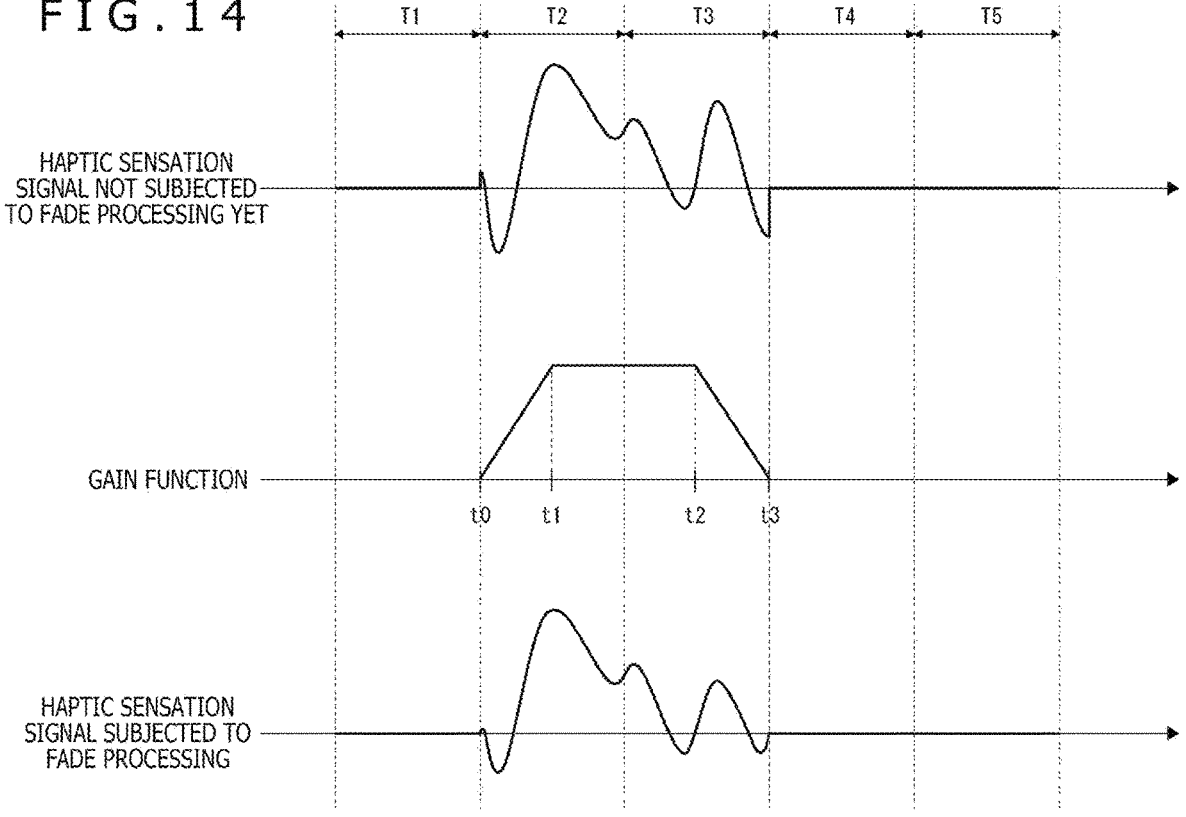
FIG. 14 is a diagram illustrating an example of the haptic sensation signal subjected to a gain function and fade processing.

Accordingly, the haptic sensation signal generation section 61 multiplies the haptic sensation signal not subjected to fade processing yet, by a gain function as illustrated in FIG. 14, to generate a haptic sensation signal subjected to fade processing.

As depicted in FIG. 14, the gain function is set such that the intensity of the haptic sensation signal increases gradually in a case where the haptic sensation reproduction flag changes from "0" to "1," and decreases gradually in a case where the haptic sensation reproduction flag changes from "1" to "0."

Specifically, in a portion corresponding to the interval T2, the gain function gradually changes from 0 to 1 from a point of time to corresponding to a start timing of the interval T2 to a predetermined point of time t1, and then remains at 1 until the end of the interval T2. The change from 0 to 1 in the gain function may or may not be linear. Additionally, the point of time t1 may be, for example, a timing when the half of the time of the interval T2 has elapsed or a timing earlier than that timing. Alternatively, the point of time t1 may be defined to be the end of the interval T2, and the gain function may change from 0 to 1 across the entire interval T2.

Additionally, in a portion corresponding to the interval T3, the gain function remains at 1 from the start of the interval T3 to a point of time t2, and gradually changes from 1 to 0 from the point of time t2 to a point of time t3 corresponding to an end timing of the interval T3. A change from 1 to 0 in the gain function may or may not be linear. Additionally, the point of time t2 may be, for example, a timing when the half of the time of the interval T3 has elapsed or a timing later than that timing. Alternatively, the point of time t2 may be defined to be the start of the interval T3, and the gain function may change from 1 to 0 across the entire interval T3.

Note that the gain function is assumed to always be 1 during an interval when the haptic sensation reproduction flag is 1 and when the haptic sensation reproduction flag is 1 both for a preceding piece of acoustic frame data SFD and for a subsequent piece of acoustic frame data SFD.

The haptic sensation signal generation section 61 executes fade-in processing and fade-out processing by multiplying, by the gain function as depicted in FIG. 14, the haptic sensation signal not subjected to the fade processing yet. As a result, the haptic sensation signal is 0 at the point of time to when haptic sensation presentation is started and at the point of time t3 when the haptic sensation presentation is ended.

5. PROCESSING FLOW

Flows of processing executed by the transmission apparatus 2 and the reception apparatus 3 provided in the haptic sensation presentation system 1 will be described with reference to the attached figures.

Note that, while the following description provides examples in which each processing operation is implemented by software, at least part of each processing operation may be implemented by hardware.

<5-1. Processing Flow of Transmission Apparatus>

Figure 15:
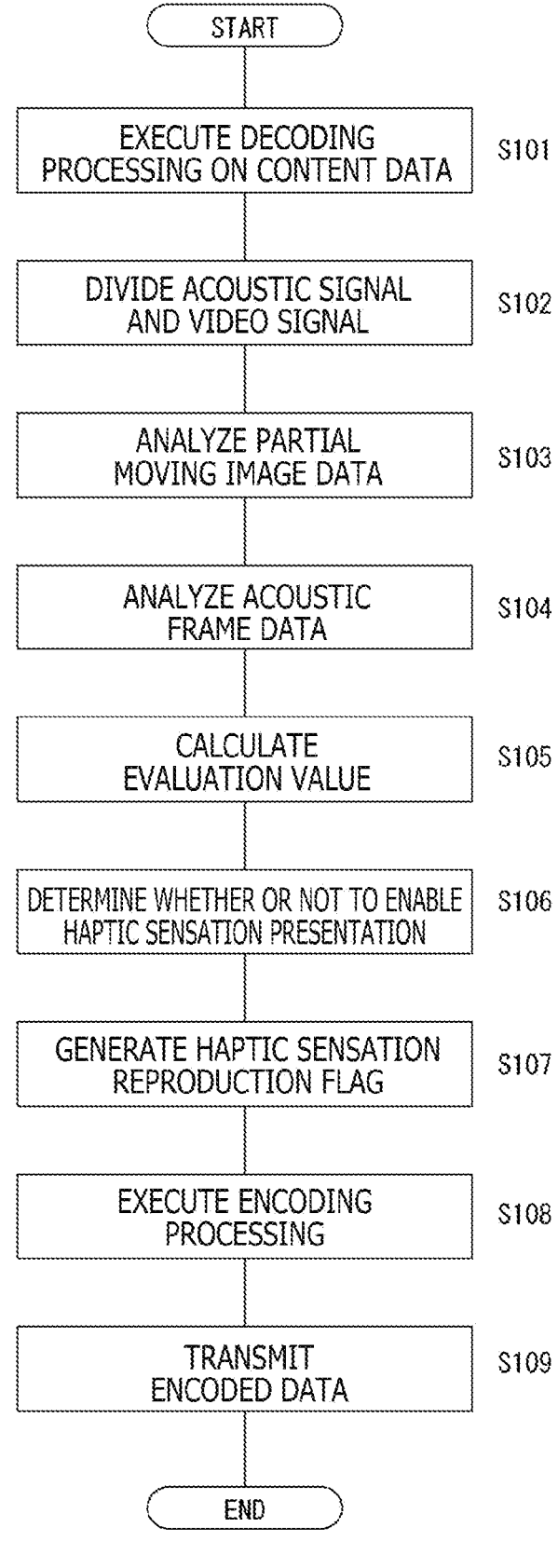
FIG. 15 is a flowchart illustrating an example of a processing flow of a transmission apparatus.

A flow of processing executed by the analysis processing section 30 and the encoding section 31 of the transmission apparatus 2 will be described with reference to FIG. 15.

In step S101, the input adjustment section 40 of the analysis processing section 30 of the transmission apparatus 2 executes decoding processing on the content data CD. The individual processing separates a video signal and an acoustic signal from the content data CD.

In step S102, the input adjustment section 40 of the analysis processing section 30 generates partial moving image data MD by dividing the video signal into pieces of data having a predetermined length of time, and generates acoustic frame data SFD by dividing the acoustic signal into pieces of data having a predetermined length of time.

In step S103, the moving image data analysis section 41 of the analysis processing section 30 analyzes the partial moving image data. This processing includes calculating the feature amounts A to C as described above.

In step S104, the acoustic analysis section 42 of the analysis processing section 30 analyzes the acoustic frame data SFD. This processing includes calculating the feature amounts D to G as described above.

In step S105, the haptic sensation reproduction determination section 43 of the analysis processing section 30 executes processing for calculating the evaluation value EV.

The haptic sensation reproduction determination section 43 of the analysis processing section 30 determines in step S106 whether or not to enable haptic sensation presentation, and generates a haptic sensation reproduction flag PF in step S107.

In step S108, the encoding section 31 executes encoding processing to generate encoded data ED.

In step S109, the communication section 34 of the transmission apparatus 2 transmits the encoded data ED to the reception apparatus 3.

<5-2. Processing Flow of Reception Apparatus>

A flow of processing executed by the decoding section 50 of the reception apparatus 3 will be described with reference to FIG. 16.

Figure 6:
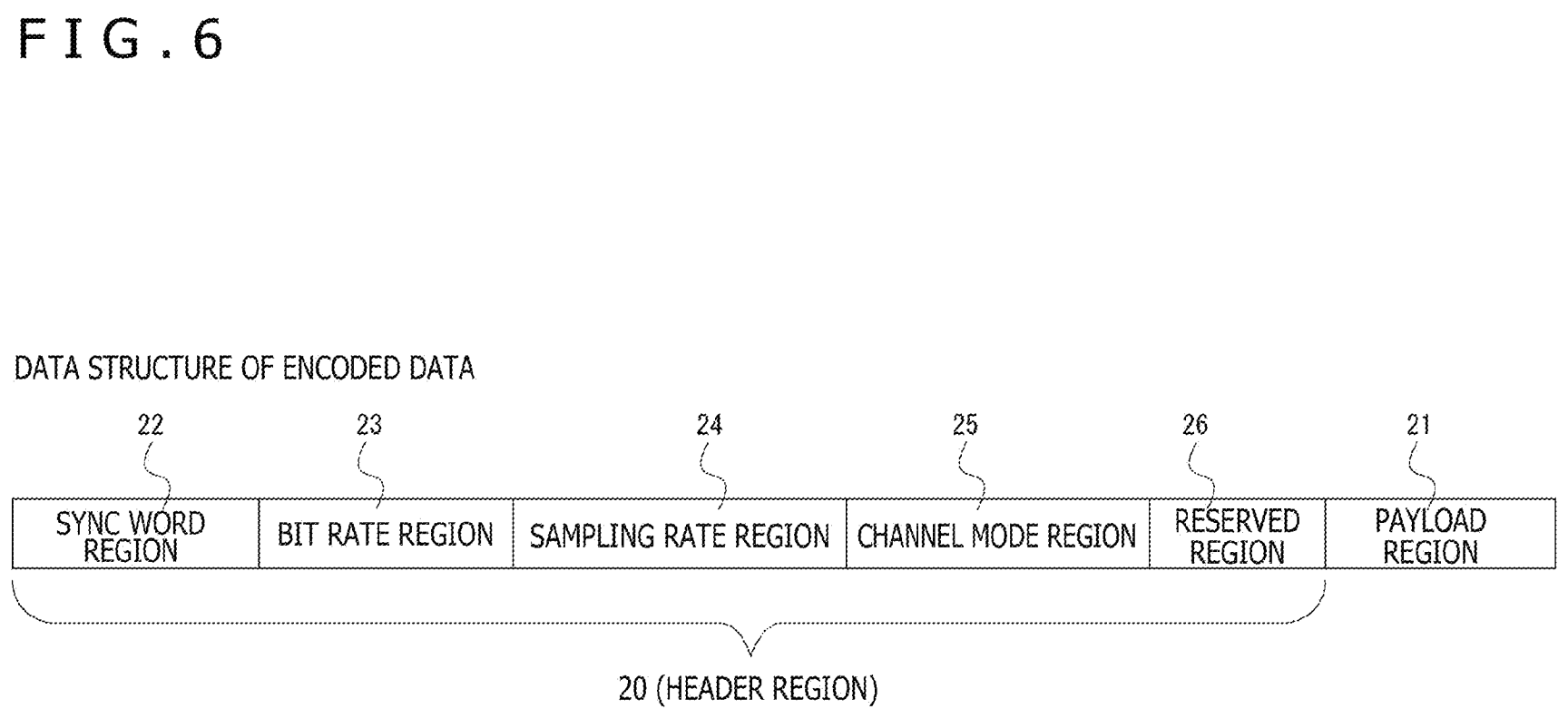

In step S201, the acoustic decoding section 60 of the decoding section 50 of the reception apparatus 3 analyzes the header region 20 of the encoded data ED and extracts information based on the data structure of the encoded data ED depicted in FIG. 6.

In step S202, the acoustic decoding section 60 of the decoding section 50 executes decoding processing on the real data stored in the payload region 21, to acquire the acoustic frame data SFD.

In step S203, the haptic sensation signal generation section 61 of the decoding section 50 checks whether or not the haptic sensation reproduction flag PF corresponding to the acoustic frame data SFD is ON. A state with the haptic sensation reproduction flag PF being ON refers to a state with the haptic sensation reproduction flag PF set to "1."

In a case where the haptic sensation reproduction flag PF is ON, then in step S204, the haptic sensation signal generation section 61 of the decoding section 50 generates a haptic sensation signal on the basis of the acoustic frame data SFD.

On the other hand, in a case where the haptic sensation reproduction flag PF is OFF, the processing in step S204 is skipped.

In step S205, the haptic sensation signal generation section 61 of the decoding section 50 determines whether or not the haptic sensation reproduction flag PF has been changed. The case where the haptic sensation reproduction flag PF has been changed refers to a case where the haptic sensation reproduction flag PF corresponding to the preceding acoustic frame data SFD differs from the haptic sensation reproduction flag PF corresponding to the current-target acoustic frame data SFD.

Figure 16:
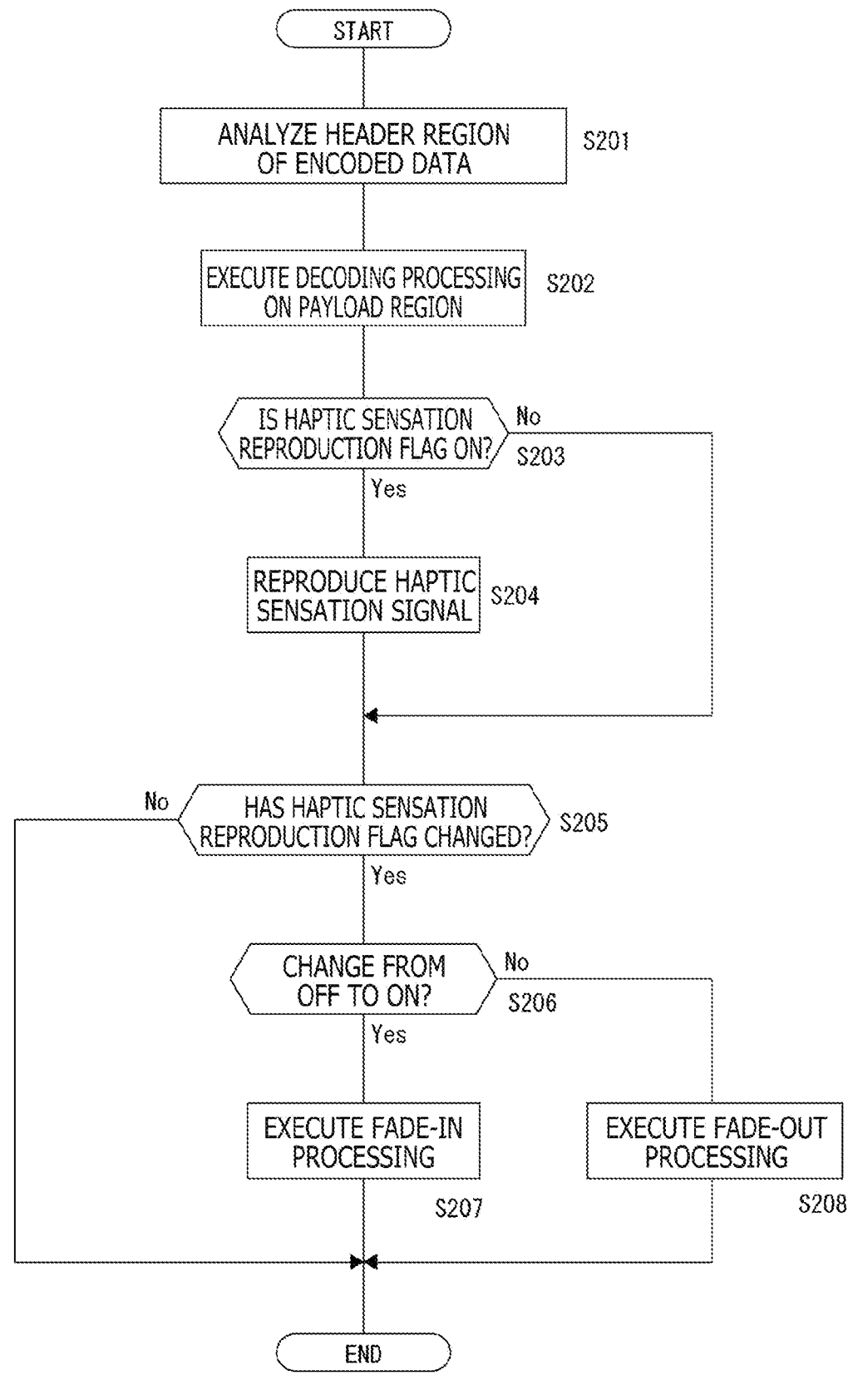
FIG. 16 is a flowchart illustrating an example of a processing flow of a reception apparatus.

In a case where the haptic sensation reproduction flag PF remains unchanged, the decoding section 50 ends the series of processing operations illustrated in FIG. 16. On the other hand, in a case where the haptic sensation reproduction flag PF has been changed, then in step S206, the haptic sensation signal generation section 61 of the decoding section 50 executes branching processing according to the direction in which the flag has been changed.

Specifically, in a case where the haptic sensation reproduction flag PF has been changed from OFF to ON, then in step S207, the haptic sensation signal generation section 61 of the decoding section 50 executes the fade-in processing.

On the other hand, in a case where the haptic sensation reproduction flag PF has been changed from ON to OFF, then in step S208, the haptic sensation signal generation section 61 of the decoding section 50 executes the fade-out processing.

6. VARIATIONS

Other forms of analysis performed by the analysis processing section 30 will be described with reference to the attached figures.

The form of a first variation is an example in which analysis is performed using program information such as an EPG (Electronic Programming Guide) for broadcasting content such as TV programs or streaming content.

Specifically, in a possible case, scene information can be acquired for each of the scenes in broadcasting content or streaming content. In this case, what each scene is like can be inferred to some degree on the basis of the scene information, and hence, whether or not to perform haptic sensation presentation may be analyzed exclusively on the basis of the scene information.

Needless to say, the analysis using the scene information in addition to the feature amounts and the evaluation value described above may be performed. For example, for a particular scene, the haptic sensation presentation may be determined not to be performed, regardless of how high the evaluation value is.

FIG. 17 is a table including scene information. The scene information includes, for example, thumbnail images each representing a respective scene, scene Nos. corresponding to the serial numbers of the scenes, the start time and end time of each scene, and scene type IDs; the thumbnail images, the scene Nos., the start time and the end time, and the scene type IDs are associated with one another.

The scene type ID is information for roughly identifying scene content and is, for example, associated with the scene content as depicted in FIG. 18. Specifically, for a scene with the scene type ID "0001," the scene type ID is assigned to a scene of a battle action such as a gun battle or sword fighting. For a scene with the scene type ID "0002," the scene type ID is assigned to a scene involving an explosion of fireworks or bombs. For a scene with the scene type ID "0011," the scene type ID is assigned to a scene with a person talking.

Such scene information is managed by the content server 100 (see FIG. 2), which streams the content data CD, and may be streamed to the transmission apparatus 2 along with the streaming of the content data CD.

Additionally, the scene information may be stored in the recording medium RM (see FIG. 4) and acquired from the recording medium RM in response to reproduction of the content data CD.

Alternatively, the scene information may be acquired from a television receiver as part of program table information for television programs or data in data broadcasting.

A second variation of analysis performed by the analysis processing section 30 will be described. The second variation is an example in which the acoustic frame data SFD is not determined in advance but is changed by a change in situation effected by an operation by the user or the like.

For example, in a case where the content data CD is game content, the acoustic signal is related to BGM, spoken lines, sound effects, or the like and is partly associated with no scene but with an operation by the user.

That is, acoustic signals are mixed and reproduced according to the scene type or the user operation. Consequently, the acoustic frame data SFD is varied depending on each operation performed by the user.

In this case, the transmission apparatus 2C as a game machine body analyzes the situation of the game content, determines whether or not the timing is appropriate for haptic sensation presentation, and sets the haptic sensation reproduction flag PF.

Here, the timing appropriate for haptic sensation presentation may be, for example, a timing of occurrence of a sound effect that is reproduced when a weapon such as a sword or a first brought down against an enemy character by a character in the game operated by the user comes into contact with the enemy character or a timing of occurrence of a sound effect that is reproduced when a bomb is exploded. In other words, the timing may be when a sound effect that is reproduced when the character operated by the user feels a certain stimulus is exerted.

7. CONCLUSION

As described above in the examples, the reception apparatus 3 (3A, 3B, 3C) in the present technology includes the reception processing section (communication section 57) that receives the data (encoded data ED) including the acoustic signal (acoustic frame data SFD) and the reproduction enabled/disabled information (haptic sensation reproduction flag PF) for the haptic sensation signal, and the haptic sensation signal generation section 61 that generates the haptic sensation signal on the basis of the acoustic signal received by the reception processing section.

Additionally, the haptic sensation signal generation section 61 generates the haptic sensation signal in a case where the reproduction enabled/disabled information indicates that reproduction is enabled (for example, in a case where the haptic sensation reproduction flag PF is set to "1"), but does not generate the haptic sensation signal in a case where the reproduction enabled/disabled information indicates that reproduction is disabled (for example, in a case where the haptic sensation reproduction flag PF is set to "0").

Thus, for some acoustic signals (acoustic frame data SFD), the haptic sensation signal generation section 61 does not generate the haptic sensation signal. For other acoustic signals, the haptic sensation signal generation section 61 generates the haptic sensation signal. That is, the haptic sensation signal is not generated for all acoustic signals.

Processing burdens related to generation of haptic sensation signals are reduced by the presence of acoustic signals for which no haptic sensation signal is generated. Additionally, by determining whether to enable or disable generation of a haptic sensation signal depending on the reproduction enabled/disabled information, the haptic sensation signal can be generated only during periods when the haptic sensation signal is required. In particular, in a case where the haptic sensation signal is generated from the acoustic signal, the haptic sensation signal generated may be small in a case where the acoustic signal is small. Then, the user may fail to sense the small haptic sensation signal. By generating the haptic sensation signal depending on the reproduction enabled/disabled information, generation of such unnecessary haptic sensation signals can be avoided. In addition, there are some acoustic signals containing sounds inappropriate for haptic sensation presentation, and the like. Haptic sensation presentation based on such an acoustic signal may make the user feel uncomfortable. By setting the reproduction enabled/disabled information indicating that the haptic sensation presentation is not to be performed during such a reproduction interval, the haptic sensation presentation that makes the user feel uncomfortable can be avoided.

Additionally, the reception processing section is considered to receive the reproduction enabled/disabled information indicating whether to enable or disable reproduction of the haptic sensation signal, instead of receiving the data concerning the haptic sensation signal. Then, the reproduction enabled/disabled information is considered to include data smaller than that of the haptic sensation signal. Consequently, compared to reception of both the data concerning the haptic sensation signal and the data concerning the acoustic signal, it is allowed to keep small the data amount of the data received by the reception processing section. This allows a reduction in bands used for communication, enabling a reduction in processing burdens required for the reception processing.

As described with reference to FIG. 6 and FIG. 10, the reproduction enabled/disabled information (for example, the haptic sensation reproduction flag PF) may be provided for each piece of the acoustic frame data SFD obtained by separating the acoustic signal into predetermined lengths of time (for example, lengths of time corresponding to the interval T1). The haptic sensation signal generation section 61 may generate the haptic sensation signal on the basis of the acoustic frame data SFD corresponding to the reproduction enabled/disabled information indicating that reproduction is enabled, and may not generate the haptic sensation signal on the basis of the acoustic frame data SFD corresponding to the reproduction enabled/disabled information indicating that reproduction is disabled.

The reproduction enabled/disabled information provided for each piece of acoustic frame data SFD allows fine setting of intervals during which to generate the haptic sensation signal.

This allows the haptic sensation signal to be reproduced as intended, allowing the appropriate haptic stimulus to be provided to the user. In particular, when the acoustic frame data SFD has a short length of reproduction time such as shorter than 100 msec, intervals requiring the haptic sensation signal and intervals requiring no haptic sensation signal can finely be set, allowing a variety of haptic sensation signals to be presented.

As described with reference to FIG. 6 and the like, the reproduction enabled/disabled information may be flag information (haptic sensation reproduction flag PF) having 1 bit.

This reduces the data amount of data received by the reception processing section (communication section 57).

Consequently, the time required for the reception processing can be shortened, allowing a reduction in communication bands required for transmission and reception of data.

As described with reference to FIG. 6 and the like, the reception data received by the reception apparatus 3 (3A, 3B, 3C) may be the encoded data ED encoded using an encoding scheme for acoustic data (for example, SBC, MP3, AAC, LDAC, or the like), and the encoded data ED may have a structure including the payload region 21 in which the acoustic frame data SFD is stored and the reserved region 26, with the reproduction enabled/disabled information stored in the reserved region 26.

The storage of the reproduction enabled/disabled information in the reserved region 26 realizes reception of the reproduction enabled/disabled information with use of a mechanism for transmitting the acoustic frame data SFD.

This eliminates the need to establish a data structure and a communication scheme for receiving the haptic sensation signal and the reproduction enabled/disabled information, allowing a reduction in costs for constructing environments. Additionally, this configuration is preferable in a case where environments in which a data structure dedicated to the haptic sensation signal is generated or utilized have not prevailed.

As described with reference to FIG. 8 and the like, the reproduction enabled/disabled information (for example, the haptic sensation reproduction flag PF) may be generated on the basis of the partial moving image data MD to be reproduced in synchronization with the acoustic frame data SFD.

Whether or not to provide the user with a haptic stimulus may fail to be determined from the acoustic signal acquired from the acoustic frame data SFD.

Further, the video viewed by the user may include various scenes, and image analysis may enable determination of whether or not the scene is appropriate for haptic sensation presentation. In such a case, by generating the reproduction enabled/disabled information on the basis of the partial moving image data MD, the possibility of appropriate haptic sensation presentation can be increased.

As described with reference to FIG. 11 and FIG. 12, the haptic sensation signal generation section 61 in the reception apparatus 3 (3A, 3B, 3C) may execute the fade-in processing and the fade-out processing on the generated haptic sensation signal.

The fade processing such as the fade-in processing or the fade-out processing is processing for gradually increasing or reducing the signal over time and involves multiplication by the predetermined gain function. The appropriate fade processing at the start and end of the haptic sensation presentation allows the haptic sensation presentation to smoothly be started and ended, allowing natural haptic sensation experiences to be provided.

Consequently, the user can be prevented from being discouraged, and enjoy an enhanced immersive experience.

As described with reference to FIG. 11 and FIG. 12, the haptic sensation signal generation section 61 of the reception apparatus 3 (3A, 3B, 3C) may execute the fade-in processing and the fade-out processing on the basis of the reproduction enabled/disabled information (for example, the haptic sensation reproduction flag PF) corresponding to the target acoustic frame data SFD1 and the reproduction enabled/disabled information corresponding to the preceding acoustic frame data SFD2 that is acoustic frame data SFD immediately preceding the target acoustic frame data SFD1. Specifically, the fade-in processing may be executed on the haptic sensation signal generated from the target acoustic frame data SFD1 in a case where the reproduction enabled/disabled information corresponding to the target acoustic frame data SFD1 indicates that reproduction is enabled and the reproduction enabled/disabled information corresponding to the preceding acoustic frame data SFD2 indicates that reproduction is disabled. The fade-out processing may be executed on the haptic sensation signal generated from the preceding acoustic frame data SFD2 in a case where the reproduction enabled/disabled information corresponding to the target acoustic frame data SFD1 indicates that reproduction is disabled and the reproduction enabled/disabled information corresponding to the preceding acoustic frame data SFD2 indicates that reproduction is enabled.

That is, either the fade-in processing operation or the fade-out processing operation is executed at the timing when the reproduction enabled/disabled information is changed.

Accordingly, the haptic sensation signal that enables haptic sensation presentation without making the user feel uncomfortable is generated, allowing a sense of immersion into content to be enhanced.

As described above with reference to various examples, the transmission apparatus 2 (2A, 2B, 2C) includes the analysis processing section 30 that executes analysis processing on the content data CD including at least the acoustic signal and generates the reproduction enabled/disabled information (for example, the haptic sensation reproduction flag PF) indicating whether to enable or disable reproduction of the haptic sensation signal, and the transmission processing section (communication section 34) that transmits the reproduction enabled/disabled information and the content data CD.

Analysis of the content data CD allows determination of a reproduction interval during which to perform haptic sensation presentation or a reproduction interval during which not to perform haptic sensation presentation.

Consequently, by setting the reproduction enabled/disabled information in such a manner that reproduction of the haptic sensation signal is not performed during intervals inappropriate for haptic sensation presentation, the haptic sensation presentation appropriate for the user can be performed.

Additionally, by transmitting, to the reception apparatus, the reproduction enabled/disabled information including, for example, 1-bit flag information instead of transmitting the haptic sensation signal itself, communication bands can be reduced, and processing burdens and processing time required for the transmission processing can be reduced.

As described with reference to FIG. 7, FIG. 8, and the like, the analysis processing section 30 in the transmission apparatus 2 (2A, 2B, 2C) may determine whether to enable or disable reproduction of the haptic sensation signal for each piece of the acoustic frame data SFD obtained by separating the acoustic signal into predetermined lengths of time. The transmission processing section (communication section 34) may perform transmission processing with each piece of acoustic frame data SFD associated with the reproduction enabled/disabled information (for example, the haptic sensation reproduction flag PF).

By setting the reproduction enabled/disabled information for each piece of the acoustic frame data SFD, intervals during which to generate the haptic sensation signal can finely be set.

This allows the haptic sensation signal to be reproduced as intended, allowing the appropriate haptic stimulus to be provided to the user. In particular, when the acoustic frame data SFD has a short length of reproduction time such as shorter than 100 msec, intervals requiring the haptic sensation signal and intervals requiring no haptic sensation signal can finely be set, allowing a variety of haptic sensation signals to be presented.

As described with reference to FIG. 7 and the like, the encoding section 31 may be provided to generate the encoded data ED including the acoustic frame data SFD and the reproduction enabled/disabled information (for example, the haptic sensation reproduction flag PF) corresponding to the acoustic frame data SFD, and the transmission processing section (communication section 34) may transmit the encoded data ED in the transmission processing.

Thus, standardized encoded data ED having a predetermined data structure is transmitted.

Consequently, possible mismatch between pieces of data can be prevented, facilitating upgrading of the data structure.

As described with reference to FIG. 7 and the like, the analysis processing section 30 in the transmission apparatus 2 (2A, 2B, 2C) may generate reproduction enabled/disabled information (for example, the haptic sensation reproduction flag PF) on the basis of the analysis result of the acoustic signal (for example, the analysis result of the acoustic frame data SFD).

A haptic stimulus may preferably be presented in synchronization with sounds provided to the user. According to the present configuration, analysis processing is executed on the acoustic signal, and whether or not to perform the haptic sensation presentation is determined on the basis of the analysis result. This allows determination of whether or not the haptic sensation presentation in synchronization with sounds is appropriate.

Consequently, the haptic sensation presentation can be performed in synchronization with the sounds provided to the user. For example, in a case where an explosion sound can be identified, the haptic sensation presentation in synchronization with the explosion sound can be performed.

As described with reference to FIG. 8 and the like, the content data CD may include moving image data to be reproduced in synchronization with the acoustic signal, and the analysis processing section 30 may execute the analysis processing on the moving image data and generate the reproduction enabled/disabled information (for example, the haptic sensation reproduction flag PF) on the basis of the analysis results of both the acoustic signal and the moving image data.

In a case where the content data CD includes a video, presentation of a haptic stimulus to the user in synchronization with the video may be more preferable than presentation of a haptic stimulus to the user in synchronization with sounds.

According to the present configuration, the analysis processing is executed on the moving image data to allow determination of whether or not to present the haptic stimulus in the scene in synchronization with the video.

Consequently, the haptic sensation can be presented to the user in synchronization with the moving image data. In particular, in a case where the acoustic signal includes background music or the like, whether or not to present the haptic sensation to the user may fail to be appropriately determined. In such a case, by determining whether or not to perform the haptic sensation presentation in consideration of the results of the analysis processing for the moving image data, haptic sensation presentation inappropriate for the user can be prevented from being performed.

As described using [Equation 3], [Equation 4], and the like, the analysis processing section 30 in the transmission apparatus 2 (2A, 2B, 2C) may generate reproduction enabled/disabled information (for example, the haptic sensation reproduction flag PF) on the basis of the spectral flatness in the acoustic frame data SFD.

By determining whether or not to perform the haptic sensation presentation, with use of the spectral flatness in the acoustic frame data SFD, the rate of increase in spectral flatness, or the like, the possibility of performing appropriate haptic sensation presentation can be increased.

Consequently, the user can be provided with an enhanced sense of immersion into content and a sense of satisfaction.

As described using [Equation 5], [Equation 6], and the like, the analysis processing section 30 in the transmission apparatus 2 (2A, 2B, 2C) may generate the reproduction enabled/disabled information on the basis of the total value of power spectra of frequency components equal to or less than a threshold (for example, 100 Hz) in the acoustic frame data SFD.

Thus, it is possible to determine whether or not to perform the haptic sensation presentation, on the basis of the total value of power spectra of low frequency components in the acoustic frame data SFD or the rate of increase in total value.

Consequently, a haptic stimulus based on a deep bass can be provided to the user, enabling the haptic sensation presentation to the user without making the user feel uncomfortable.

As described using [Equation 1], [Equation 2], and the like, the analysis processing section 30 in the transmission apparatus 2 (2A, 2B, 2C) may generate the reproduction enabled/disabled information on the basis of the total value of luminance values of a plurality of pixels in the moving image data.

This allows detection of a scene, such as an explosion scene, which involves a significant change in luminance value.

Consequently, the haptic sensation presentation can be performed without making the user feel uncomfortable.

As described using the feature amount C and the like, the analysis processing section 30 in the transmission apparatus 2 (2A, 2B, 2C) may generate the reproduction enabled/disabled information (for example, the haptic sensation reproduction flag PF) on the basis of whether or not the face of a person having a predetermined size or larger is detected in the moving image data.

For example, a scene with a close-up of the face of a person is inferred to be a scene with the person talking. For such a scene, if the haptic sensation presentation is performed in response to the talking voice of the person, the user may feel uncomfortable. To avoid this, in a case where a scene with a close-up of the face of a person is detected, the haptic sensation presentation is determined not to be performed.

This allows avoidance of such haptic sensation presentation that makes the user feel like being shaken in synchronization with the voice of a person.

The information processing method executed by the reception apparatus 3 (3A, 3B, 3C) includes processing of receiving the data (encoded data ED) including the acoustic signal and the reproduction enabled/disabled information (for example, the haptic sensation reproduction flag PF) for the haptic sensation signal, generating the haptic sensation signal on the basis of the received acoustic signal in a case where the reproduction enabled/disabled information indicates that reproduction is enabled, and determining not to generate the haptic sensation signal in a case where the reproduction enabled/disabled information indicates that reproduction is disabled.

Additionally, the information processing method executed by the transmission apparatus 2 (2A, 2B, 2C) includes processing of executing analysis processing on the content data CD including at least the acoustic signal to generate the reproduction enabled/disabled information (for example, the haptic sensation reproduction flag PF) indicating whether to enable or disable reproduction of the haptic sensation signal, and transmitting the reproduction enabled/disabled information and the acoustic signal.

A program that the reception apparatus 3 (3A, 3B, 3C) is caused to execute is a program causing, for example, an arithmetic processing apparatus such as the CPU included in the reception apparatus 3 to execute functions of receiving the data (encoded data ED) including the acoustic signal and the reproduction enabled/disabled information (for example, the haptic sensation reproduction flag PF) for the haptic sensation signal, generating the haptic sensation signal on the basis of the received acoustic signal in a case where the reproduction enabled/disabled information indicates that reproduction is enabled, and determining not to generate the haptic sensation signal in a case where the reproduction enabled/disabled information indicates that reproduction is disabled.

Such a program allows the above-described decoding section 50 to be implemented by an arithmetic processing apparatus such as a microcomputer.

A program that the transmission apparatus 2 (2A, 2B, 2C) is caused to execute is a program causing, for example, an arithmetic processing apparatus such as the CPU included in the transmission apparatus 2 to execute functions of executing analysis processing on the content data CD including at least the acoustic signal to generate the reproduction enabled/disabled information (for example, the haptic sensation reproduction flag PF) indicating whether to enable or disable reproduction of a haptic sensation signal, and transmitting the reproduction enabled/disabled information and the acoustic signal.

Such a program allows the above-described analysis processing section 30 and encoding section 31 to be implemented by an arithmetic processing apparatus such as a microcomputer.

Such a program can be recorded in advance in an HDD as a recording medium built into a device such as a computer apparatus, a ROM in a microcomputer with a CPU, or the like. Alternatively, the program can be temporarily or permanently saved (recorded) in a removable recording medium such as a flexible disk, a CD-ROM, an MO (Magneto Optical) disc, a DVD, a Blu-ray disc, a magnetic disk, a semiconductor memory, or a memory card. Such a removable recording medium can be provided as what is generally called package software.

Additionally, such a program can be downloaded from a download website via a network such as a LAN (Local Area Network) or the Internet, as an alternative to being installed into a personal computer or the like from the removable recording medium.

Note that the effects described herein are only illustrative and not restrictive and that any other effects can be produced.

Additionally, the above-described examples may be combined in any manner, and the above-described various effects can be produced even in a case where various combinations are used.

8. PRESENT TECHNOLOGY

The present technology can also adopt the following configurations.

(1)

A reception apparatus including:

a reception processing section configured to receive data including an acoustic signal and reproduction enabled/disabled information for a haptic sensation signal; and a haptic sensation signal generation section configured to generate the haptic sensation signal on the basis of the acoustic signal received by the reception processing section, in which the haptic sensation signal generation section generates the haptic sensation signal in a case where the reproduction enabled/disabled information indicates that reproduction is enabled, but does not generate the haptic sensation signal in a case where the reproduction enabled/disabled information indicates that reproduction is disabled.

(2)

The reception apparatus according to (1) above, in which the reproduction enabled/disabled information is provided for each piece of acoustic frame data obtained by separating the acoustic signal into predetermined lengths of time, the haptic sensation signal generation section generates the haptic sensation signal on the basis of the acoustic frame data corresponding to the reproduction enabled/disabled information indicating that reproduction is enabled, but does not generate the haptic sensation signal on the basis of the acoustic frame data corresponding to the reproduction enabled/disabled information indicating that reproduction is disabled.

(3)

The reception apparatus according to any of (1) to (2) above, in which the reproduction enabled/disabled information includes flag information having 1 bit.

(4)

The reception apparatus according to (2) above, in which the data received includes encoded data encoded using an encoding scheme for acoustic data, the encoded data has a structure including a payload region in which the acoustic frame data is stored and a reserved region, and the reproduction enabled/disabled information is stored in the reserved region.

(5)

The reception apparatus according to any of (2) or (4) above, in which the reproduction enabled/disabled information is generated on the basis of partial moving image data to be reproduced in synchronization with the acoustic frame data.

(6)

The reception apparatus according to any of (1) to (5) above, in which the haptic sensation signal generation section executes fade-in processing and fade-out processing on the generated haptic sensation signal.

(7)

The reception apparatus according to (6) above, in which the haptic sensation signal generation section executes fade-in processing on the haptic sensation signal generated from a target piece of acoustic frame data in a case where the reproduction enabled/disabled information corresponding to the target acoustic frame data indicates that reproduction is enabled and the reproduction enabled/disabled information corresponding to a preceding piece of acoustic frame data that is acoustic frame data immediately preceding the target acoustic frame data indicates that reproduction is disabled, and executes fade-out processing on the haptic sensation signal generated from the preceding acoustic frame data in a case where the reproduction enabled/disabled information corresponding to the target acoustic frame data indicates that reproduction is disabled and the reproduction enabled/disabled information corresponding to the preceding acoustic frame data indicates that reproduction is enabled.

(8)
A transmission apparatus including:
an analysis processing section configured to execute analysis processing on content data including at least an acoustic signal and generate reproduction enabled/disabled information indicating whether to enable or disable reproduction of a haptic sensation signal; and
a transmission processing section configured to transmit the reproduction enabled/disabled information and the acoustic signal.

(9)
The transmission apparatus according to (8) above, in which
the analysis processing section determines whether to enable or disable reproduction of the haptic sensation signal for each piece of acoustic frame data obtained by separating the acoustic signal into predetermined lengths of time, and
the transmission processing section performs the transmission with each piece of the acoustic frame data associated with the reproduction enabled/disabled information.

(10)
The transmission apparatus according to (9) above, including:
an encoding section configured to generate encoded data including the acoustic frame data and the reproduction enabled/disabled information corresponding to the acoustic frame data, in which
the transmission processing section transmits the encoded data in the transmission.

(11)
The transmission apparatus according to any of (8) to (10) above, in which
the analysis processing section generates the reproduction enabled/disabled information on the basis of an analysis result of the acoustic signal.

(12)
The transmission apparatus according to any of (8) to (11) above, in which
the content data includes moving image data to be reproduced in synchronization with the acoustic signal, and
the analysis processing section
executes analysis processing on the moving image data, and,
on the basis of an analysis result of the moving image data, generates the reproduction enabled/disabled information.

(13)
The transmission apparatus according to any of (9) to (10) above, in which
the analysis processing section generates the reproduction enabled/disabled information on the basis of spectral flatness in the acoustic frame data.

(14)
The transmission apparatus according to any of (9) to (10) above, in which
the analysis processing section generates the reproduction enabled/disabled information on the basis of a total value of power spectra of frequency components equal to or less than a threshold in the acoustic frame data.

30

(15)
The transmission apparatus according to (12) above, in which
the analysis processing section generates the reproduction enabled/disabled information on the basis of a total value of luminance values of a plurality of pixels in the moving image data.

(16)
The transmission apparatus according to (12) above, in which
the analysis processing section generates the reproduction enabled/disabled information on the basis of whether or not a face of a person with a predetermined size or larger is detected in the moving image data.

(17)
An information processing method executed by a computer apparatus, including processing of:
receiving data including an acoustic signal and reproduction enabled/disabled information for a haptic sensation signal;
generating the haptic sensation signal on the basis of the received acoustic signal in a case where the reproduction enabled/disabled information indicates that reproduction is enabled; and
determining not to generate the haptic sensation signal in a case where the reproduction enabled/disabled information indicates that reproduction is disabled.

(18)
An information processing method executed by a computer apparatus, including processing of:
executing analysis processing on content data including at least an acoustic signal and generating reproduction enabled/disabled information indicating whether to enable or disable reproduction of a haptic sensation signal; and
transmitting the reproduction enabled/disabled information and the acoustic signal.

(19)
A program causing an arithmetic processing apparatus to execute functions of:
receiving data including an acoustic signal and reproduction enabled/disabled information for a haptic sensation signal;
generating the haptic sensation signal on the basis of the received acoustic signal in a case where the reproduction enabled/disabled information indicates that reproduction is enabled; and
determining not to generate the haptic sensation signal in a case where the reproduction enabled/disabled information indicates that reproduction is disabled.

(20)
A program causing an arithmetic processing apparatus to execute functions of:
executing analysis processing on content data including at least an acoustic signal and generating reproduction enabled/disabled information indicating whether to enable or disable reproduction of a haptic sensation signal; and
transmitting the reproduction enabled/disabled information and the acoustic signal.

REFERENCE SIGNS LIST

2, 2A, 2B, 2C: Transmission apparatus
3, 3A, 3B, 3C: Reception apparatus
21: Payload region
26: Reserved region 30: Analysis processing section 31: Encoding section 34: Communication section (transmission processing section)

57: Communication section (reception processing section)

61: Haptic sensation signal generation section

CD: Content data

ED: Encoded data

SED: Acoustic frame data

MD: Partial moving image data

PF: Haptic sensation reproduction flag

The invention claimed is:

1. A reception apparatus, comprising:
a reception processing section configured to receive data including each of an acoustic signal and reproduction enabled/disabled information, wherein
the received data includes encoded data,
the encoded data is encoded based on an encoding scheme that is associated with acoustic data,
a structure of the encoded data includes a payload region and a reserved region,
the payload region is configured to store a plurality of pieces of acoustic frame data, and
the reserved region is configured to store the reproduction enabled/disabled information; and
a haptic sensation signal generation section configured to generate a haptic sensation signal based on each of the acoustic signal and the reproduction enabled/disabled information that indicates a reproduction of the haptic sensation signal is enabled, wherein
the haptic sensation signal is not generated based on the reproduction enabled/disabled information that indicates the reproduction of the haptic sensation signal is disabled.

2. The reception apparatus according to claim 1, wherein
the reproduction enabled/disabled information is associated with each piece of the plurality of pieces of acoustic frame data,
the haptic sensation signal generation section is further configured to generate the haptic sensation signal based on a first piece of the plurality of pieces of acoustic frame data,
the reproduction enabled/disabled information, corresponding to the first piece of the plurality of pieces of acoustic frame data, indicates that the reproduction of the haptic sensation signal is enabled,
the haptic sensation signal is not generated based on a second piece of the plurality of pieces of acoustic frame data that is different from the first piece of the plurality of pieces of acoustic frame data, and
the reproduction enabled/disabled information, corresponding to the second piece of the plurality of pieces of acoustic frame data, indicates that the reproduction of the haptic sensation signal is disabled.

3. The reception apparatus according to claim 1, wherein the reproduction enabled/disabled information includes flag information that includes 1 bit.

4. The reception apparatus according to claim 2, wherein generation of the reproduction enabled/disabled information is based on partial moving image data, and
reproduction of the partial moving image data is in synchronization with the plurality of pieces of acoustic frame data.

5. The reception apparatus according to claim 1, wherein the haptic sensation signal generation section is further configured to execute each of a fade-in process and a fade-out process on the haptic sensation signal.

6. The reception apparatus according to claim 5, wherein the haptic sensation signal generation section is further configured to:
generate the haptic sensation signal based on a target piece of the plurality of pieces of acoustic frame data;
execute the fade-in process on the haptic sensation signal, wherein
the reproduction enabled/disabled information corresponding to the target piece of the plurality of pieces of acoustic frame data indicates that the reproduction of the haptic sensation signal is enabled,
the reproduction enabled/disabled information corresponding to a first piece of the plurality of pieces of acoustic frame data indicates that the reproduction of the haptic sensation signal is disabled, and
the first piece of the plurality of pieces of acoustic frame data precedes the target piece of the plurality of pieces of acoustic frame data of the plurality of pieces of acoustic frame data;
generate the haptic sensation signal based on the first piece of the plurality of pieces of acoustic frame data; and
execute the fade-out process on the haptic sensation signal, wherein
the reproduction enabled/disabled information, corresponding to the target piece of the plurality of pieces of acoustic frame data, indicates that the reproduction of the haptic sensation signal is disabled, and
the reproduction enabled/disabled information, corresponding to the first piece of the plurality of pieces of acoustic frame data, indicates that the reproduction of the haptic sensation signal is enabled.

7. A transmission apparatus, comprising:
an analysis processing section configured to:
execute an analysis process on content data that includes an acoustic signal; and
generate reproduction enabled/disabled information that indicates one of an enablement of a reproduction of a haptic sensation signal or a disablement of the reproduction of the haptic sensation signal;
an encoding section configured to generate encoding data that includes a plurality of pieces of acoustic frame data and the reproduction enabled/disabled information that corresponds to each of the plurality of pieces of acoustic frame data; and
a transmission processing section configured to transmit each of the encoded data, the reproduction enabled/disabled information, and the acoustic signal.

8. The transmission apparatus according to claim 7, further comprising an input adjustment section configured to generate the plurality of pieces of acoustic frame data, wherein
the analysis processing section is further configured to determine one of the enablement of the reproduction of the haptic sensation signal or the disablement of the reproduction of the haptic sensation signal for each of the plurality of pieces of acoustic frame data, and
the transmission processing section is further configured to transmit each of the plurality of pieces of the acoustic frame data that is associated with the reproduction enabled/disabled information.

9. The transmission apparatus according to claim 7, wherein the analysis processing section is further configured to generate the reproduction enabled/disabled information based on an analysis result of the acoustic signal.

10. The transmission apparatus according to claim 7, wherein the content data includes moving image data, reproduction of the moving image data is in synchronization with the acoustic signal, and the analysis processing section is further configured to:

execute the analysis process on the moving image data; and generate the reproduction enabled/disabled information based on an analysis result of the moving image data.

11. The transmission apparatus according to claim 8, wherein the analysis processing section is further configured to generate the reproduction enabled/disabled information based on a spectral flatness in the plurality of peices of acoustic frame data.

12. The transmission apparatus according to claim 8, wherein the analysis processing section is further configured to generate the reproduction enabled/disabled information based on a total value of a power spectra of frequency components that is equal to or less than a threshold value, and the power spectra of frequency components is associated with the plurality of pieces of acoustic frame data.

13. The transmission apparatus according to claim 10, wherein the analysis processing section is further configured to generate the reproduction enabled/disabled information based on a total value of a plurality of luminance values of a plurality of pixels in the moving image data.

14. The transmission apparatus according to claim 10, wherein the analysis processing section is further configured to:

detect a face of a person in the moving image data; and generate the reproduction enabled/disabled information based on a size of the detected face is equal to or greater than a specific size.

15. An information processing method, comprising:

in a reception apparatus:

receiving data including each of an acoustic signal and reproduction enabled/disabled information, wherein the received data includes encoded data, the encoded data is encoded based on an encoding scheme that is associated with acoustic data, a structure of the encoded data includes a payload region and a reserved region, the payload region is configured to store a plurality of pieces of acoustic frame data, and the reserved region is configured to store the reproduction enabled/disabled information; and generating a haptic sensation signal based on each of the acoustic signal and the reproduction enabled/disabled information that indicates a reproduction of the haptic sensation signal is enabled, wherein the haptic sensation signal is not generated based on the reproduction enabled/disabled information that indicates the reproduction of the haptic sensation signal is disabled.

16. An information processing method, comprising:

in a transmission apparatus:

executing an analysis process on content data that includes an acoustic signal;

generating reproduction enabled/disabled information indicating an enablement of a reproduction of a haptic sensation signal or a disablement of the reproduction of the haptic sensation signal;

generating encoding data that includes a plurality of pieces of acoustic frame data and the reproduction enabled/disabled information corresponding to each of the plurality of pieces of acoustic frame data; and transmitting each of the encoded data, the reproduction enabled/disabled information corresponding to each of the plurality of pieces of acoustic frame data, and the acoustic signal.

17. A non-transitory computer-readable medium having stored thereon, computer-executable instructions which when executed by a computer, cause the computer to execute operations, the operations comprising:

receiving data including each of an acoustic signal and reproduction enabled/disabled information, wherein the received data includes encoded data, the encoded data is encoded based on an encoding scheme that is associated with acoustic data, a structure of the encoded data includes a payload region and a reserved region, the payload region is configured to store a plurality of pieces of acoustic frame data, and the reserved region is configured to store the reproduction enabled/disabled information; and generating a haptic sensation signal based on each of the acoustic signal and the reproduction enabled/disabled information that indicates a reproduction of the haptic sensation signal is enabled, wherein the haptic sensation signal is not generated based on the reproduction enabled/disabled information that indicates the reproduction of the haptic sensation signal is disabled.

18. A non-transitory computer-readable medium having stored thereon, computer-executable instructions which when executed by a computer, cause the computer to execute operations, the operations comprising:

executing an analysis process on content data that includes an acoustic signal;

generating reproduction enabled/disabled information indicating an enablement of a reproduction of a haptic sensation signal or a disablement of the reproduction of the haptic sensation signal;

generating encoding data that includes a plurality of pieces of acoustic frame data and the reproduction enabled/disabled information corresponding to each of the plurality of pieces of acoustic frame data; and transmitting each of the encoded data, the reproduction enabled/disabled information corresponding to each of the plurality of pieces of acoustic frame data, and the acoustic signal.

* * * * *